United States Patent [19]

Xing

[11] Patent Number: 5,553,135
[45] Date of Patent: Sep. 3, 1996

[54] POINT-TO-MULTIPOINT COMMUNICATION SYSTEM AND METHOD

[76] Inventor: Xie-Hao Xing, 9 Myrtle St., Somerville, Mass. 02145

[21] Appl. No.: 221,893

[22] Filed: Mar. 31, 1994

[51] Int. Cl.$^6$ .................................................. H04J 3/16
[52] U.S. Cl. ........................ 379/399; 379/413; 370/110.1; 370/94.1
[58] Field of Search .................................. 379/399, 412, 379/413; 370/60, 110.1, 94.1, 85.14, 85, 86, 88, 58, 94, 62

[56] References Cited

U.S. PATENT DOCUMENTS

| | | | |
|---|---|---|---|
| 4,727,495 | 2/1988 | Cheetham et al. | 364/514 |
| 4,888,766 | 12/1989 | Ogasawara | 370/95.1 |
| 4,935,923 | 6/1990 | Shimizu et al. | 370/60 |
| 5,012,466 | 4/1991 | Buhrke et al. | 370/62 |
| 5,181,199 | 1/1993 | Motoki et al. | 370/60 |
| 5,187,707 | 2/1993 | Chu et al. | 370/79 |
| 5,208,811 | 5/1993 | Kashio et al. | 370/94.1 |

*Primary Examiner*—Jeffery Hofsass
*Assistant Examiner*—Jacques M. Saint-Surin
*Attorney, Agent, or Firm*—Daniel J. Bourque; Kevin Carroll

[57] ABSTRACT

A point-to-multipoint communication system includes a central telephony unit having at least one telephony module interface coupled to at least one set of telephony modules. Each set of telephony modules includes a predetermined number of telephony modules connected in a daisy chained configuration. Each telephony module includes a plurality of terminal communication equipment interfaces which allow a corresponding number of terminal communication equipment to be coupled to each and every telephony module. Each terminal communication equipment responds to a unique terminal communication identifier which is transmitted with each message from the central telephony unit. The point-to-multipoint communication system includes a configuration mode which allows the system to automatically map its configuration including the number of telephony modules in each set and the number of terminal communication equipment coupled to any one telephony module. In an operational mode, the point-to-multipoint communication system allows a message to be transmitted generally simultaneously to each telephony module in a telephony module set, whereby a terminal communication equipment responds to a message only when the terminal communication equipment identifier in the message corresponds to the unique terminal communication identifier of the terminal communication equipment. The point-to-multipoint communication system is adapted for use in a mass transport vehicle such as an airplane cabin whereby each telephony module services at least one segment of one row of airplane seats, and whereby each terminal communication equipment is disposed at one airplane cabin seat.

17 Claims, 21 Drawing Sheets

32

HANDSET CHAIN POSITION TO EXTENSION
(AIRCRAFT CONFIGURATION FILE ONE)

CHAIN NUMBER: (TMI #)　　　　　　CHAIN LOCATION: (PORT ADDRESS)

| CHAIN POSITION | TCE NUMBER | EXTENSION | CHAIN POSITION | TCE POSITION | EXTENSION |
|---|---|---|---|---|---|
| (TM #) 1 | 1 | (DIGITS) | (TM #) 4 | 1 | (DIGITS) |
|  | 2 | (DIGITS) |  | 2 | (DIGITS) |
|  | 3 | (DIGITS) |  | 3 | (DIGITS) |
| 2 | 1 | (DIGITS) | 5 | 1 | (DIGITS) |
|  | 2 | (DIGITS) |  | 2 | (DIGITS) |
|  | 3 | (DIGITS) |  | 3 | (DIGITS) |
| 3 | 1 | (DIGITS) | N | 1 | (DIGITS) |
|  | 2 | (DIGITS) |  | 2 | (DIGITS) |
|  | 3 | (DIGITS) |  | 3 | (DIGITS) |

(CONTINUED ON NEXT SCREEN)

TMI CHAIN AND TM COUNT
(AIRCRAFT CONFIGURATION FILE TWO)

| TMI NUMBER | TM NUMBER | TMI NUMBER | TM NUMBER |
|---|---|---|---|
| 1 | 40 | 11 | 40 |
| 2 | 40 | 12 | 40 |
| 3 | 40 | 13 | 40 |
| 4 | 40 | 14 | 40 |
| 5 | 40 | 15 | 40 |
| 6 | 40 | 16 | 40 |
| 7 | 40 | 17 | 40 |
| 8 | 40 | 18 | 40 |
| 9 | 40 | 19 | 40 |
| 10 | 40 | 20 | 40 |

(CONTINUED ON NEXT SCREEN)

FIG. 6

36
TM ADDRESS MAP
(STM ID TO E1 NUMBER AND STM POSITION)

TMI CARD NUMBER: _____    CHAIN NUMBER: N

TMI CARD LOCATION: _____    CHAIN STATUS: ACTIVE

| TMI CHAIN POSITION | TM ID | STM CHAIN POSITION | STM ID |
|---|---|---|---|
| 1 | **** | 11 | (DIGITS) |
| 2 | (DIGITS) | 12 | (DIGITS) |
| 3 | (DIGITS) | 13 | (DIGITS) |
| 4 | (DIGITS) | 14 | (DIGITS) |
| 5 | (DIGITS) | 15 | (DIGITS) |
| 6 | (DIGITS) | 16 | (DIGITS) |
| 7 | (DIGITS) | 17 | (DIGITS) |
| 8 | (DIGITS) | 18 | (DIGITS) |
| 9 | (DIGITS) | 19 | (DIGITS) |
| 10 | (DIGITS) | 20 | (DIGITS) |

(CONTINUED ON NEXT SCREEN)

FIG. 7

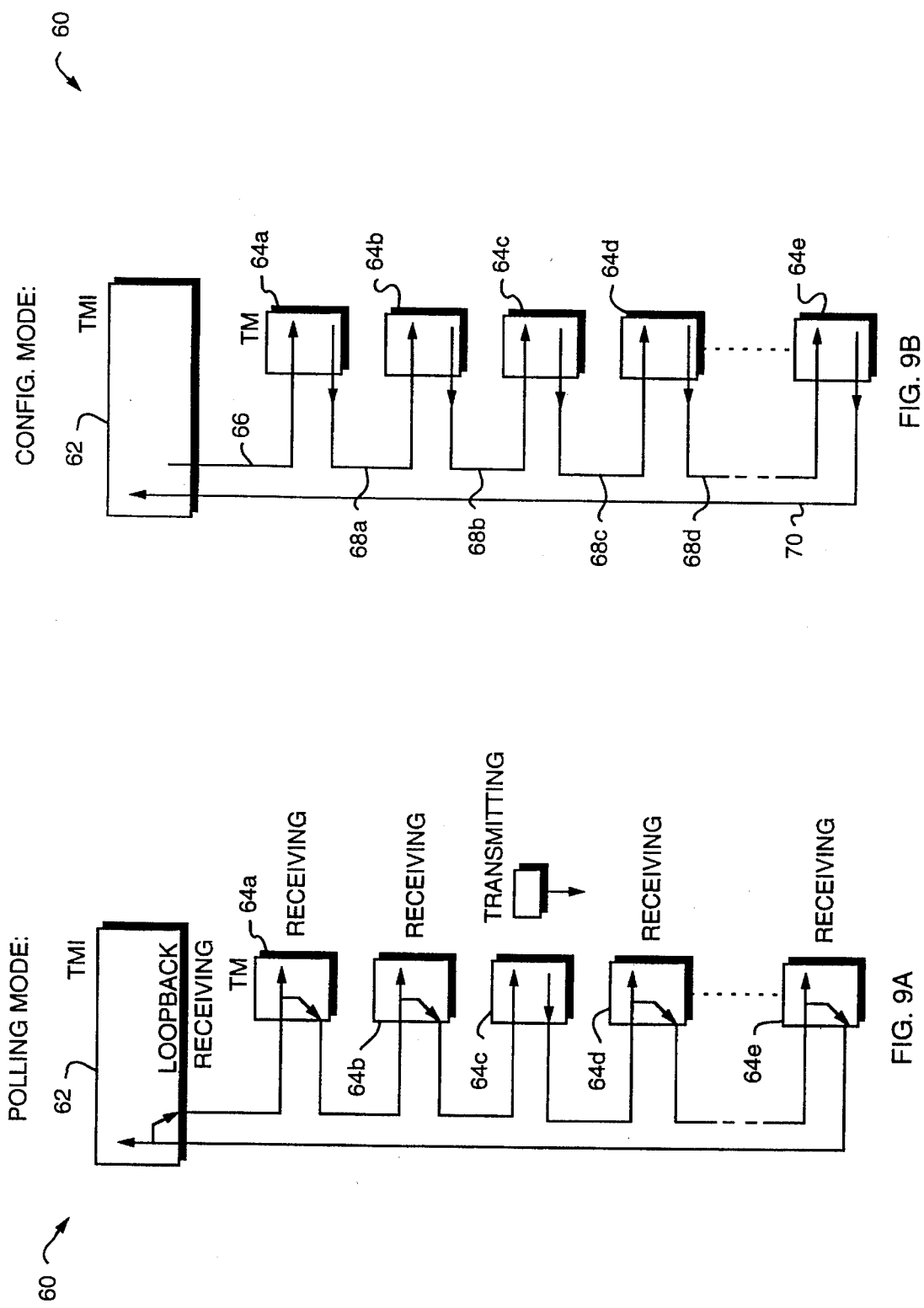

MODE CONTROL FRAMES
MODE_CONFIG:
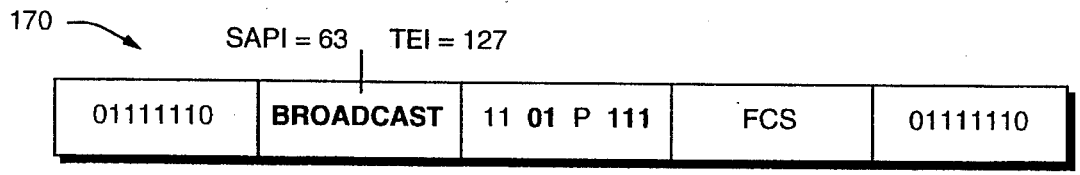
MODE_POLLING:
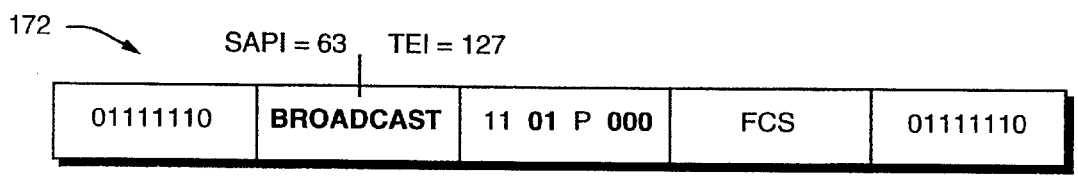
FIG. 23
POLLING FRAMES
POLL:
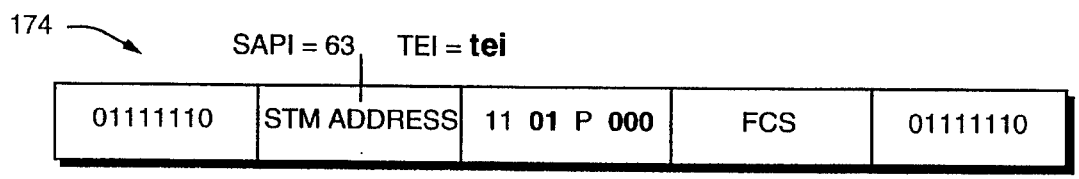
ACK:
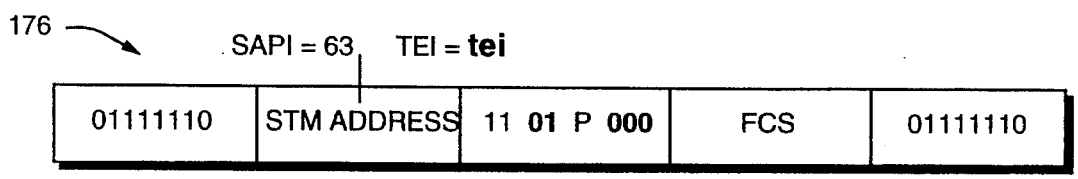
FIG. 24

POINT-TO-MULTIPOINT COMMUNICATION SYSTEM AND METHOD

FIELD OF THE INVENTION

This invention relates to telecommunication systems and more particularly, to an communication system and method which provides a point-to-multipoint communication network over a single communication channel.

BACKGROUND OF THE INVENTION

ISDN based communication systems are quickly becoming the standard for voice and data communication systems given their ability to combine standard telephone or voice type communications which typically is performed by circuit switches which occupy an entire communication path, with the advantages of data communication systems which often transmit data in packets. As a rule, existing data or packet communication technology and pure telephone technology can generally not be applied to solving ISDN based communication problems.

There are currently two ISDN based communication services or interface methods. The first, illustrated in FIG. 1, is the conventional primary rate interface (PRI) method which is used in a point-to-point configuration typically connecting first and second Data Termination Equipment (DTE) such as central offices over first and second trunk lines.

In a second service type system, commonly referred to as basic rate interface (BRI), the current CCITT standard of ISDN allows a point-to-two-point communication topography as illustrated in FIGS. 2 and 3. The interface specification for this ISDN standard is expressly limited to two DTE connected to a central office, other DTE, or other centrally located telephony control unit.

None of the current ISDN interface standards support service to more than two points from a central unit. Given the popularity and proliferation of ISDN service, however, it is preferred and indeed desirable that present and future communication systems follow ISDN service guidelines. Given the increased usage of ISDN based communication services and the cost of providing central DTE's such as telephony units, it is now apparent that new systems must be designed which allow a central DTE such as a telephony type unit to support communication to a large number of telephony modules. Presently, the ISDN standard interfaces do not support such a configuration.

Several prior art systems exist which attempt to overcome the limitations of the ISDN interfaces, as presently defined, in the hopes of providing such point-to-multipoint communication service. For example, U.S. Pat. No. 5,187,707 to Chu, et al. as well as other equivalent systems all utilize a multiplexing scheme whereby a number of terminal communication equipment are time multiplexed over one communication channel. Such a system results in a fixed or predetermined time slot for each terminal communication equipment. In all of the systems, the system topography is a multiple drop bus configuration. Most importantly, none of the prior art allows such an ISDN system to maintain the state of each terminal communication equipment. Finally, none of the prior art systems allow the communication equipment to be automatically configurable, thereby allowing the system to quickly and easily establish an equipment availability and identification map.

Accordingly, what is required is an communication system and method for providing point-to-multipoint communication services utilizing a currently defined and established protocol such as ISDN. Additionally, such a system must be able to be automatically mapped into a central data terminal equipment unit so as to establish a table of currently connected and available communication equipment, each of which should be uniquely and individually addressable without the need for multiplexing.

SUMMARY OF THE INVENTION

This invention features a point-to-multipoint communication system and method. The system includes a central Data Terminal Equipment such as telephony unit which operates to send, receive and process communications to a uniquely identifiable terminal communication equipment from among a number of terminal communication equipment coupled to the system. Although this invention is explained with regard to a telephony system, this is not a limitation of the invention. Additionally, although this invention is described with regard to an ISDN based communication protocol, this is also not a limitation of the invention.

The central DTE unit includes at least one telephony module interface. Coupled to the at least one telephony module interface is at least first and second telephony modules. The first telephony module is coupled to a predetermined telephony module interface by means of a first communication circuit wire segment. The second telephony module is coupled to the first telephony module by means of a second communication circuit segment, and also coupled to the telephony module interface by means of a third communication circuit segment. Internally, the first communication module includes a link between the first communication circuit segment and the second communication circuit segment, while the second telephony module includes an internal link from the second communication circuit segment to the third communication circuit segment. In this manner, each telephony module coupled to a telephony module interface of the central telephony unit may generally simultaneously receive a communication message.

Each of the at least first and second telephony modules includes a number of terminal equipment interfaces, for transmitting and receiving communication data to and from a corresponding number of terminal communication equipment coupled to a given telephony module. Each communication terminal equipment is coupled to a respective one of the number of terminal equipment interfaces.

In the preferred embodiment, the point-to-multipoint ISDN based communication system of the present invention includes a central telephony unit with a plurality of telephony module interfaces. Each of the telephony module interfaces is coupled to a set of telephony modules, each set having a predetermined maximum number of telephony modules. Each of the predetermined number of telephony modules in place and active in any given set of telephony modules are coupled in succession forming a series of successively connected telephony modules.

The set of telephony modules successively connected are defined by a first telephony module in the series, a last telephony module in the series, and a number of telephony modules intermediate the first and last telephony modules. The first telephony modules in a series is coupled to a respective telephony module interface by a first communication circuit segment. Each of the intermediate telephony modules and the last telephony module are successively coupled to the first telephony module by means of a number of second communication circuit segments, while the last telephony module is coupled to the telephony module interface by means of the third communication circuit segment.

Each terminal communication equipment coupled to a respective telephony module includes or is programmable so as to define a unique terminal communication equipment identifier for each terminal communication equipment. Thus, the present system is selectably operable in either a configuration mode or an operational mode.

In the configuration mode, the central telephony unit identifies each set of telephony modules coupled to each telephony module interface in the central telephony unit. The configuration mode also identifies each coupled telephony module which forms each set, as well as each terminal communication equipment coupled to each telephony module. The configuration mode of the present system further establishes one unique terminal communication system identifier for each coupled terminal communication equipment.

In the operational mode, the point-to-multipoint ISDN based communication system of the present invention assigns a unique terminal communication equipment identifier to each message transmitted over the communication system. Since each telephony module includes an internal link linking the first communication circuit segment to the second communication segment or alternatively, the second communication segment to the third communication circuit segment, each telephony module in at least a given set receives generally simultaneously a message to be transmitted to one terminal communication equipment coupled to one telephony module in the set. Each telephony module examines each message and only responds to a message which includes a terminal communication identifier which matches the terminal communication identifier of one of the terminal communication equipment units which is coupled to it. In this manner, many telephony modules are "listening" to messages passed through the chain of coupled telephony modules, but only the telephony module including a terminal communication equipment having a unique identifier which matches the unique identifier in the message will respond.

In the preferred embodiment, the telephony module interfaces conform to the PRI (Primary Rate Interface) specification for an ISDN service interface. Additionally, the present system is preferably adapted for use in a confined environment such as an airplane cabin. In such an implementation, the central telephony unit is located in a central location in the airplane cabin and is coupled to a number of telephony modules. Each telephony module services at least a segment of a row of airplane cabin seats.

In the preferred embodiment, it is contemplated that any given telephony module interface may service up to forty telephony modules, also referred to as seat telephony modules. In turn, each telephony module may be coupled to from one to eight terminal communication equipment, each one of which may include a telephone handset or other communication port at each seat in the airplane.

In this manner, a large number of users may, by means of multiple terminal communication equipment be coupled to one "D" channel of an ISDN communication system without time multiplexing. In this manner, each person may utilize a terminal communication equipment to communicate with another terminal communication unit coupled to the central telephony unit or alternatively, to an outside communication service or system.

This invention also features a method of providing point-to-multipoint communication which includes providing a central data terminal equipment unit operative for sending, receiving and processing communication signals. The central data terminal equipment unit includes at least one communication equipment module interface. The method also includes providing at least one set of communication equipment modules, each set of communication equipment modules including at least first and second communication equipment modules. The first communication equipment module is coupled to at least one communication equipment module interface by means of a first communication circuit segment, while the second communication equipment module is coupled to the first communication equipment module by means of a second communication circuit segment, and also coupled to the communication equipment module interface by means of a third communication circuit segment.

Each of the first and second communication equipment modules include a plurality of terminal equipment interfaces, each terminal equipment interface adapted for transmitting and receiving communication signals to and from a coupled terminal communication equipment.

In the preferred embodiment, the method of providing point-to-multipoint communication according to the present invention further includes operating a communication system in one of a configuration mode and an operational mode. In a configuration mode, the central data terminal equipment unit identifies each set of communication equipment modules coupled to a corresponding communication equipment module interface; identifies each coupled communication equipment module which forms each communication equipment module set; identifies each terminal communication equipment coupled to each communication equipment module; and determines when you need terminal communication equipment identifier for each coupled terminal communication equipment.

In the operational mode, the method of the present invention includes operating a communications system in such a manner that each terminal communication equipment in a respective set of communication equipment modules examines each and every message directed to at least the respective set of communication equipment modules while generally simultaneously passing each and every message to each other terminal communication equipment in a respective set of communication equipment modules. Each and every message which is transmitted includes a unique terminal communication identifier which identifies one terminal communication equipment coupled to one communication equipment module to which a respective message is directed. Each terminal communication equipment coupled to each communication equipment module responds only to a message which includes a unique terminal communication equipment identifier which corresponds to the unique terminal communication equipment identifier of the terminal communication equipment to which the message is directed.

DESCRIPTION OF THE DRAWINGS

These and other features and advantages of the present invention will be better understood by reading the following detailed description, taken together with the drawings wherein:

FIG. 5 is an illustration of the terminal communication equipment chain position to extension number configuration file generated by the central telephony unit of the present invention;

FIG. 6 is an illustration of the telephony module interface chain and telephony module count configuration file of the central telephony unit of the present invention;

FIG. 7 is a telephony module chain position and telephony module identification address map maintained by the telephony module interface for each telephony module chain for the system of the present invention;

FIGS. 9A and 9B illustrate the polling and configuration mode of the present invention;

FIG. 23 is an illustration of the mode control frames according to the present invention; and FIG. 24 is an illustration of the polling frames according to one aspect of the present invention.

DETAILED DESCRIPTION OF THE PREFERRED EMBODIMENT

Figure 1:
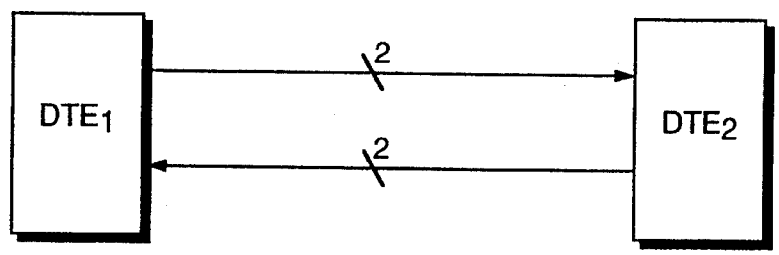
FIGS. 1–3 illustrate the interconnection of the prior art ISDN based communication systems.
Figure 2:
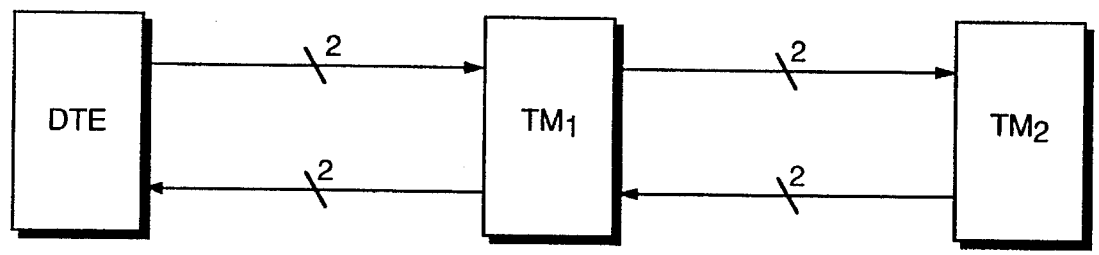
Figure 3:
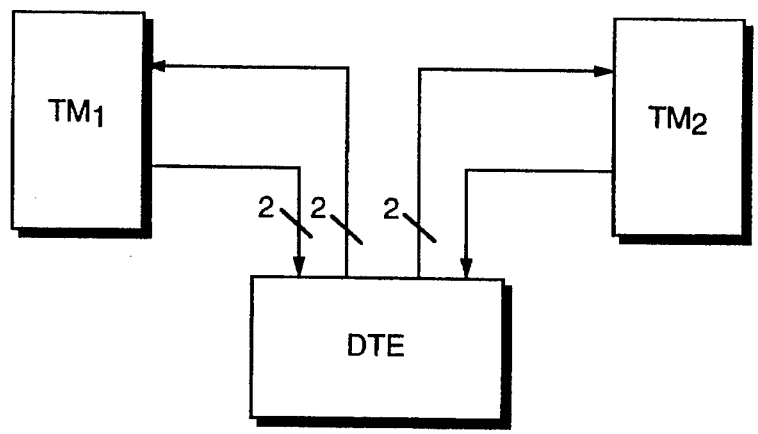
Figure 4:
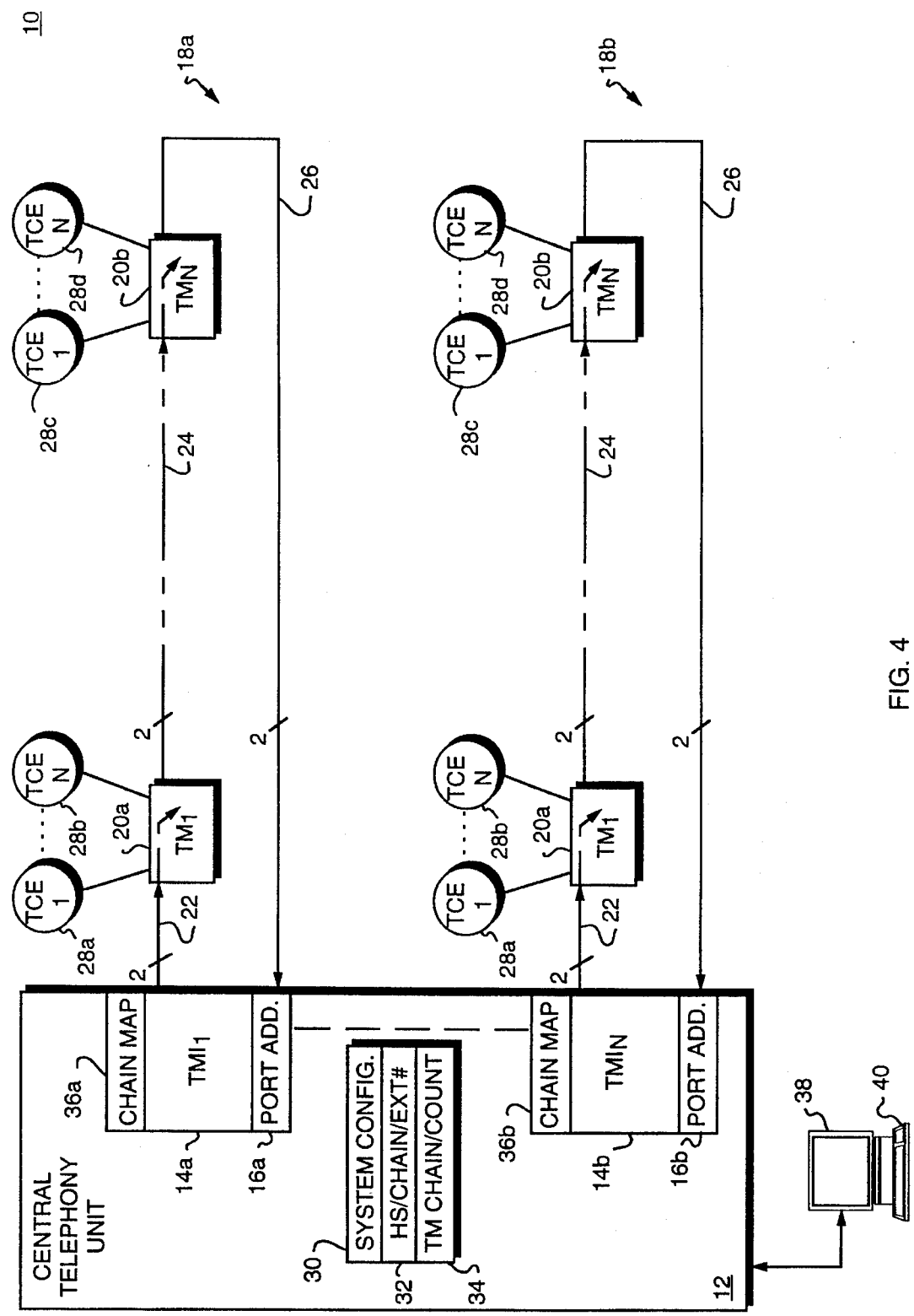
FIG. 4 is a schematic representation of the point-to-multipoint ISDN based communication system according to the present invention.

The point-to-multipoint ISDN based communication system 10, FIG. 4, according to the present invention includes a central telephony unit 12 which serves as the control unit or director for the entire communication system. The central telephony unit 12 includes, for exemplary purposes a standard ISDN based communication controller and signal processor.

The central telephony unit 12 includes one or more telephony module interfaces 14a, 14b, each of which are preassigned a port address 16a, 16b respectively. The port addresses may be assigned by either hardware or software, as is well known in the art.

Coupled to each telephony interface are chains 18a–18b of telephony modules. In the preferred embodiment, it is contemplated that the central telephony unit support at least eight telephony module interfaces and thus, eight chains of telephony modules. Each chain of telephony modules 18a, 18b includes a number of telephony modules 20a, 20b. It is contemplated that each chain of telephony modules will, in the preferred embodiment, support up to twenty telephony modules.

The telephony modules 20a, 20b of each chain 18a, 18b of telephony modules are coupled in a "daisy chained" configuration. Accordingly, the first telephony module 20a of each chain of telephony modules is coupled to its respective telephony module interface 14 by means of a first communication circuit segment 22. In the system, it is contemplated that the communication circuit comprise a two wire cable which conforms to the layer 1 specifications of the current CCITT definition of an ISDN layer 1 interconnection circuit. Second and subsequent telephony modules 20b are coupled to the first telephony modules 20a by means of a second communication circuit segment 24. Each "last" telephony module (such as telephony modules 20b) in each chain of telephony modules 18a, 18b are then coupled to their respective telephony module interface 14 by means of a return or third communication circuit segment 26.

Each telephony module 20a, 20b is operative in one of either a polling mode or a configuration mode. In the configuration mode, wherein the point-to-multipoint ISDN based communication system 20 is being configured or reconfigured, each telephony module 20a, 20b is operative in a "open loop" configuration whereby each message transmitted down the chain through first and second communication circuit segments 22, 24 are intercepted and read, and examined for correct telephony module addressing, before being retransmitted down the chain to the next telephony module in the chain.

During the polling mode (the standard communication mode), each and every telephony module in the chain receives, generally simultaneously, a communication packet and responds to a packet only if a telephony module address included in the packet matches or corresponds to a respective telephony modules address or identification, as will be explained in greater detail below.

Each telephony module 20a, 20b is coupled to a plurality of terminal communication equipment 28a–28d. Examples of terminal communication equipment 28a–28d includes telephone handsets, computers, fax machines, or any other type of similar voice or data communication equipment which are operable on a communication system such as an ISDN based system. In the preferred embodiment and configuration, as will be explained further below, it is contemplated that each telephony module be coupled to three terminal communication equipment.

In order for the central telephony unit 12 to be able to maintain and control communication to and from each of the many terminal communication equipment coupled to each and every telephony module in each chain, several system wide configuration files and mapping tables must be maintained. Accordingly, a system wide configuration file 30 is maintained in the central telephony unit, and includes at least a first file 32 which maintains a listing of each terminal communication equipment coupled to the system, along with the terminal equipment's chain number and assigned extension number. The system configuration file 30 also includes a second file 34 which maintains a listing of each telephony module interface coupled to the system, as well as the number of telephony modules currently connected and active in each respective chain coupled to each telephony module interface. Such a configuration file is shown in greater detail in FIG. 6.

Referring again to FIG. 4, the central telephony unit 12, in order to be able to route messages to each and every telephony module coupled to any chain of the communication system, must maintain either centrally, or at the telephony module interface level, one or more telephony module chain mapping tables 36a, 36b, which serve to identify each telephony module coupled to each and every telephony module interface, along with a telephony module identification code, typically four digits, by which each telephony module is individually addressable. An exemplary telephony module address mapping table is shown in FIG. 7. As is shown in this table, each telephony module is identified by its physical position in the chain, along with a corresponding telephony module identification code. The lack of telephony module identification code, or the appearance of four stars indicates that no telephony module is presently at the chain position or is present and not active.

In order to maintain the point-to-multipoint ISDN based communication system 10, FIG. 4, according to the present invention, the central telephone unit 12 is coupled to a monitor and keyboard 38, 40, respectively, which facilitate data, such as configuration information, to be input into the central telephone unit, and to allow the system configuration 30 to be manually entered and updated, as will be explained in greater detail below.

Figure 8:
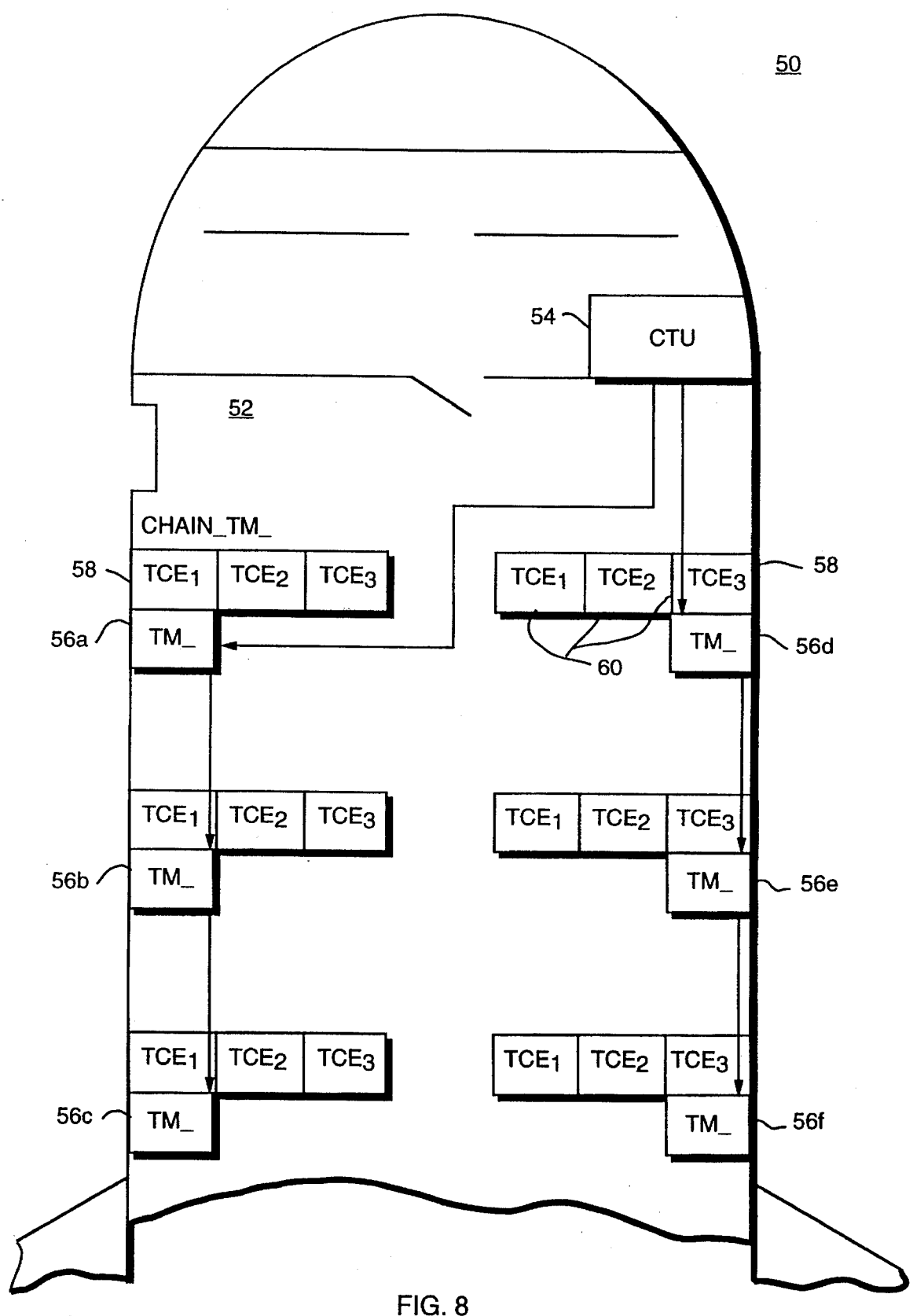
FIG. 8 is a schematic representation with the preferred embodiment of the point-to-multipoint ISDN based communication system of the present invention implemented in an aircraft cabin.

In the preferred embodiment, the point-to-multipoint ISDN based communication system 50, FIG. 8, is well suited for installation in an aircraft cabin 52. In such an installation, the central telephony unit 54 is located at a convenient location within the aircraft cabin and coupled to a plurality of telephony modules 56a–56f. In the preferred embodiment, each telephony module services one row of seats 58, each row of seats including three seats 60. Thus, each telephony module 56a–56f is connected to up to three individual terminal communication equipment, each terminal communication equipment located at each seat 60.

Dependant upon the aircraft configuration, each telephony module on each side of the aircraft may belong to a separate chain, and each chain coupled to a telephony module interface as previously described in conjunction with FIG. 4, although it is understood that many various configurations are possible, and are within the scope of the present invention.

As stated previously, the point-to-multipoint communication system according to the present invention is operative in one of two modes namely, a configuration mode and a polling mode.

Although the default operation mode is the polling mode, the configuration mode is entered during initial system commissioning, or when telephony module maintenance is desired to be accomplished, such as when a telephony module must be added or removed. As illustrated in FIG. 9B, a given telephony module chain 60 includes a telephony module interface 62 coupled to a plurality of telephony modules 64a–64e. The configuration mode is caused to be entered when the telephony module interface 62 transmits a telephony module configuration frame which is received generally simultaneously by each telephony module 64a–64e. At this point, each telephony module 64a–64e enters an open loop internal configuration whereby each message transmitted by the central telephony unit through the telephony module interface is intercepted and evaluated before being retransmitted to the next telephony module in the chain position.

Thus, the first telephony module 64a in the chain will be the first to receive a message after entry of the configuration mode. The message will be received over the first communication circuit segment 66. After processing the message, the first telephony module 64a will, if necessary, append its message to the stream of messages being intercepted, before being retransmitted. Each telephony module receives all packets or messages which pass by it and first checks to see whether or not the information is destined for that particular telephony module by comparing the address and the packet (identifier) with the telephony modules internal address (identifier). This process is performed regardless of whether or not a particular telephony module has its own packets to transmit. It should be noted that a telephony module may have its address assigned during manufacturing or by a hardware process, such as switch settings, etc. or alternatively, the telephony module may contain some electronically programmable device to which its address may be written.

Figure 10A:
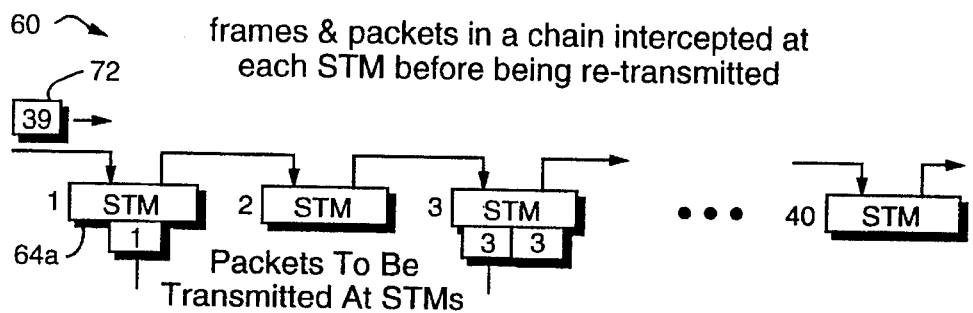
FIGS. 10A–10F illustrate the flow and operation of the configuration mode according to one aspect of the present invention.
Figure 10B:
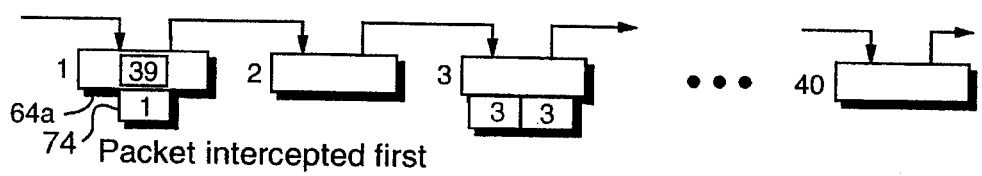

FIGS. 10A–10F illustrate the configuration mode of the point-to-multipoint ISDN based communication system of the present invention. As shown in FIG. 10A, the first telephony module 64a in the chain 60 is the first to receive a first packet or frame of information 72. The first telephony module 64a receives this information, even though it has its own message 74 to transmit. When a packet is intercepted, whether in the configuration or polling mode, the telephony module compares the address in the packet with its own internal predefined address. Each telephony module's predefined address may be established by hardware, such as jumpers or switch settings or alternatively, may be programmed by the system by writing to an electrically programmable circuit device such as an EEP or other similar device.

Figure 10C:
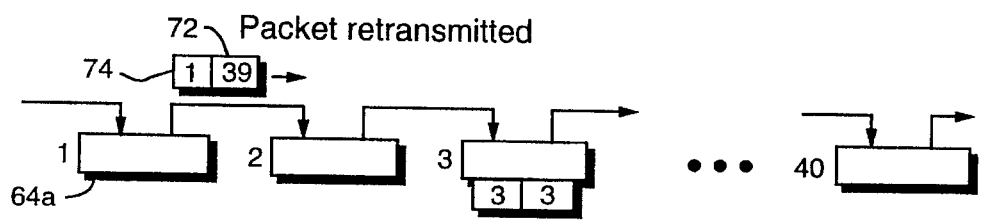
Figure 10D:
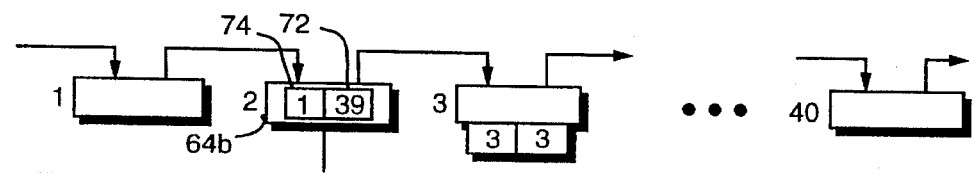

As shown in FIG. 10C, the first telephony module 64a will retransmit the first received packet 72 after appending to it its own packet 74. The two packets of information are then received by the second and subsequent telephony module 64b even if the second or subsequent telephony module has no packets of its own to transmit, FIG. 10D.

Figure 10E:
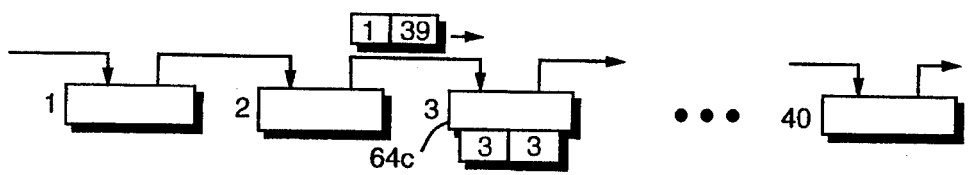
Figure 10F:
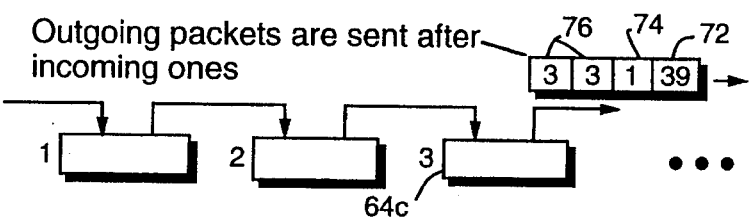

As shown in FIGS. 10E and 10F, the third and subsequent telephony module 64c will also intercept and retransmit the first packets 72, 74 after pending its own message packets 76. Thus, the information flow is unidirectional and accordingly, packets or frames sent by a downstream telephony module to an upstream telephony module have to pass through the central telephony unit and the telephony module interface on their way to their destination. The configuration mode appears as a token passing operation although there is no explicit token being passed along the chain of telephony modules. Access control or contention is achieved by virtue of a telephony module's position in the chain. Upstream telephony modules will get a chance to receive and transmit their packets or frames earlier than any downstream telephony modules.

The polling mode is the default mode for regular communication or call processing. The polling mode is entered immediately upon initialization and re-entered after a configuration mode operation is complete, such as when the central telephony unit receives an indication that the last telephony module on a chain has transmitted or retransmitted the frames or messages, or upon the expiration of a timer which signals the re-entry of the polling mode.

In the polling mode, all telephony modules can receive all packets passing by. This occurs almost simultaneously at each telephony module if propagation delay is ignored due to the relatively small size of a chain. As each telephony module receives a packet, it checks the address of the packet with its own internal address and continues further processing only if there is an address match.

Polling mode is a centralized operation wherein each telephony module interface of the central telephony unit maintains a polling table and sequentially polls each telephone module associated with a given chain of telephony modules. The telephony module interface will not send out a subsequent poll until an acknowledge (ACK) frame with a telephony module chain position is received. This polling table is based on the telephony module chain position address map 36 previously described in conjunction with FIGS. 4 and 7.

Each and every telephony module in a chain receives each and every poll transmitted by the telephony module interface. Each telephony module then checks the destination or address of the poll and if no address match is found, the poll is discarded. Thus, only one telephony module in a chain will find an address match and will therefore get a turn to transmit a packet or frame. When a telephony module which has been polled completes its transmission, it sends an acknowledge (ACK) with its identification number back to the telephony module interface. If the telephony module does not have anything to transmit when a poll is received, it sends back an acknowledge immediately whereupon the central telephony unit, through the telephony module interface will poll the next telephony module in the chain.

The central telephony unit itself is also treated as a telephony module in the polling process. The central telephony unit is polled first, before any telephony module is polled. Additionally, the central telephony unit is different in that it can interrupt the polling process and insert its own packets midway through the polling process. This is accomplished given that the polling mode is a centralized operation and the central telephony unit maintains control over all centralized operations.

As shown in FIG. 9, a chain 60 of a plurality of telephony modules 64a–64e coupled to a given telephony module interface 62 operate, in the operational mode, in a closed loop configuration whereby each message is received by each telephony module for subsequent examination but generally simultaneously passed on to each downstream telephony module. Only when a telephony module is polled and wishes to transmit a packet or frame does it enter an open loop configuration such as shown in telephony module 64c.

Figure 11:
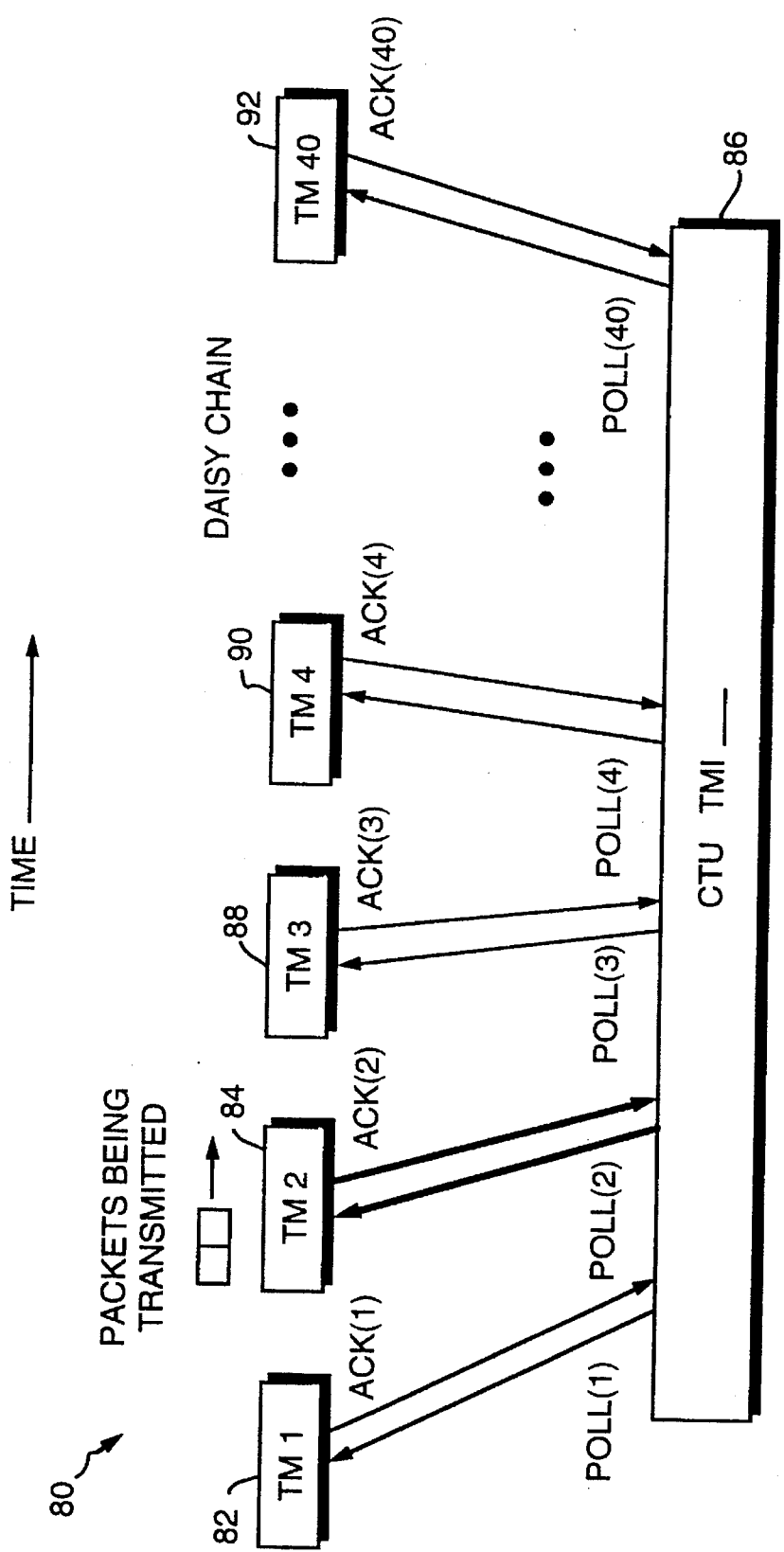
FIG. 11 is a flow diagram illustrating the transmission of information in the point-to-multipoint ISDN based communication system of the present invention which has entered the polling mode of operation.

The polling mode of operation is also shown in conjunction with FIG. 11, wherein a first telephony module 82 in a telephony module chain 80 is polled and immediately responds with an acknowledge signal, having had no information to transmit. The second telephony module in the chain position 84 is next polled and transmits its two packets of information along with its acknowledge signal which immediately is routed through all other intermediate telephony modules back to the telephony module interface 86. Subsequently, each downstream telephony module 88–92 is polled for messages.

Figure 12:
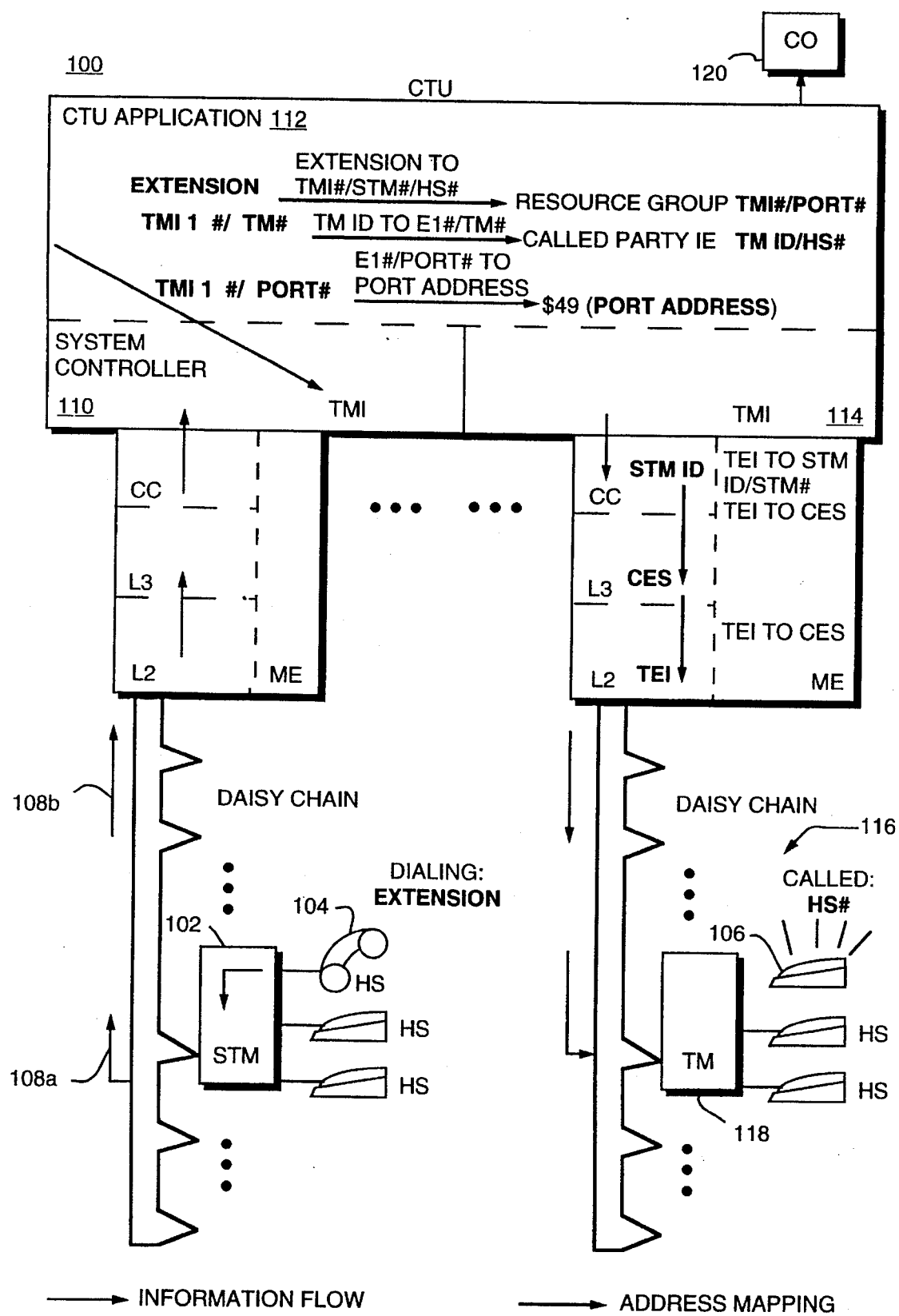
FIG. 12 is a schematic representation of the flow of information and address mapping which takes place during communication from one terminal communication equipment to another terminal communication equipment on the same system of the present invention.

The processing of the placement of a call from one handset (an exemplary type of terminal communication equipment—TCE) to another handset on the same system is illustrated in point-to-multipoint system 100, FIG. 12. In this system, a first polled telephony module 102 to which is coupled a terminal communication equipment or handset 104 desiring to call a second handset 106 in a different chain transmits the requisite information along the chain as indicated by arrows 108a and 108b according to the standard layer two and layer three ISDN protocol inventions, to the telephony module interface 110 of the central telephony unit 112.

Once this information is received by the application program then running on the central telephony unit 112, the central telephony unit utilizes the telephony module address map 36 and various mapping files 32, 34 (see FIGS. 4–7) to determine the telephony module interface number, port address, telephony module identification code and handset number of the called party 106. The central telephony unit 112 will then pass the message to the telephony module interface 114 which controls the chain 16 of telephony modules to which the called handset 106 belongs. At the appropriate time, determined by the polling table maintained by the telephony module interface 114, the telephony module 118 to which the called handset 106 is coupled will receive a packet of information including its own internal address and will thus transmit the contents of that packet to handset 106. In this manner, it can be seen that communication flows from terminal communication equipment through a polled telephony module to the central unit and then either externally to the central telephony unit to an outside resource such as central office 120 or to another telephony module interface when the message is destined to another terminal communication equipment coupled to the system.

As previously mentioned, telephony modules are also referred to as seat telephony modules (STM) in the environment of an aircraft cabin. The telephony modules may have a unique electronic serial number generated during manufacturing although alternatively, this information may be written into EE PROM by the central telephony unit during commissioning. A telephony module identification is selected to be forty-eight bits or six bytes in length, this length chosen to accommodate Dallas chips. Advantageously, any telephony module can be installed in any location as long as the location is valid according to the configuration file.

In the ISDN environment, this invention is implemented in a sub-layer 2 environment. Accordingly, a new previously undefined ISDN layer two (2) communication message has been developed as part of the present invention. This new, bi-directional internal message is coded as $0E and is utilized for communication between the telephony module interface (TMI) board also commonly referred to as an E1 board with the central telephony unit operating system and/or central telephony unit application. These new internal messages are set forth in table 1 below.

TABLE 1

| Code | Definition |
| --- | --- |
| TM_CONFIG | To enter config mode and initiate a TM configuration in a chain. |
| TM_POLL | To enter polling mode. |
| TM_READ | To read in TM ID of a TM. |
| TM_ADD | To add a TM into a chain. |

TABLE 1-continued

| Code | Definition |
| --- | --- |
| TM_MOVE | To remove a TM from a chain. |
| TM_REGISTER | To register a TM ID to system controller. |
| TM_REPORT | To report the result of a TM_READ. |

If TM ID is to be assigned by the CTU, add:

| | |
| --- | --- |
| TM_ASSIGN | To initiate a TM assignment in a chain. |
| TM_CONFIRM | To confirm a TM ID to system controller. |
| TM-WRITE | To write TM ID to a TM. |
| TM_RESPONSE | To respond to a TM_WRITE. |

Figure 13:
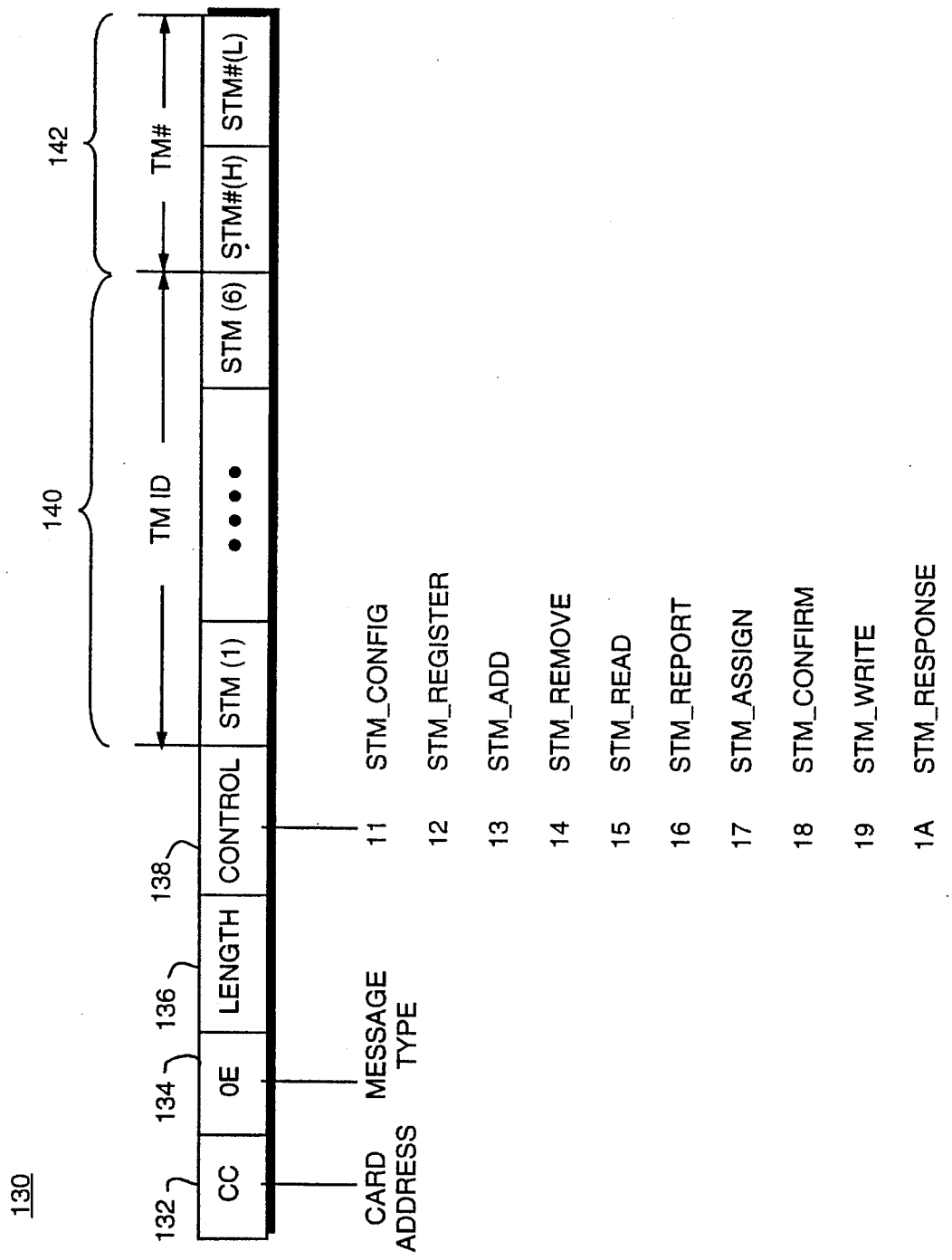
FIG. 13 is an illustration of the internal message format of the system according to the present invention.

The structure of the internal message $0E 130, FIG. 13, includes a multibyte address beginning with the first byte 132 indicating the card address which corresponds to the telephony module interface of a particular chain, followed by the $0E message type byte 134. Third byte 136 identifies the length of the message while control byte 138 identifies the type of message being transmitted. The fifth through tenth bytes collectively make up the sixth telephony module identification bytes 140, while the eleventh and twelfth bytes identify the telephony module number in the chain.

The layer two ISDN frames with SAPI=63 (standard ISDN layer 2 data link layer management) and a control field starting with "1" are similar in structure. The messages generally fall into two broad categories, one for mode control and the other for polling. Mode control allows the system to switch between configuration and polling modes, while polling control allows the telephony module interface to either poll or await for an acknowledgement from a given telephony module.

Figure 14:
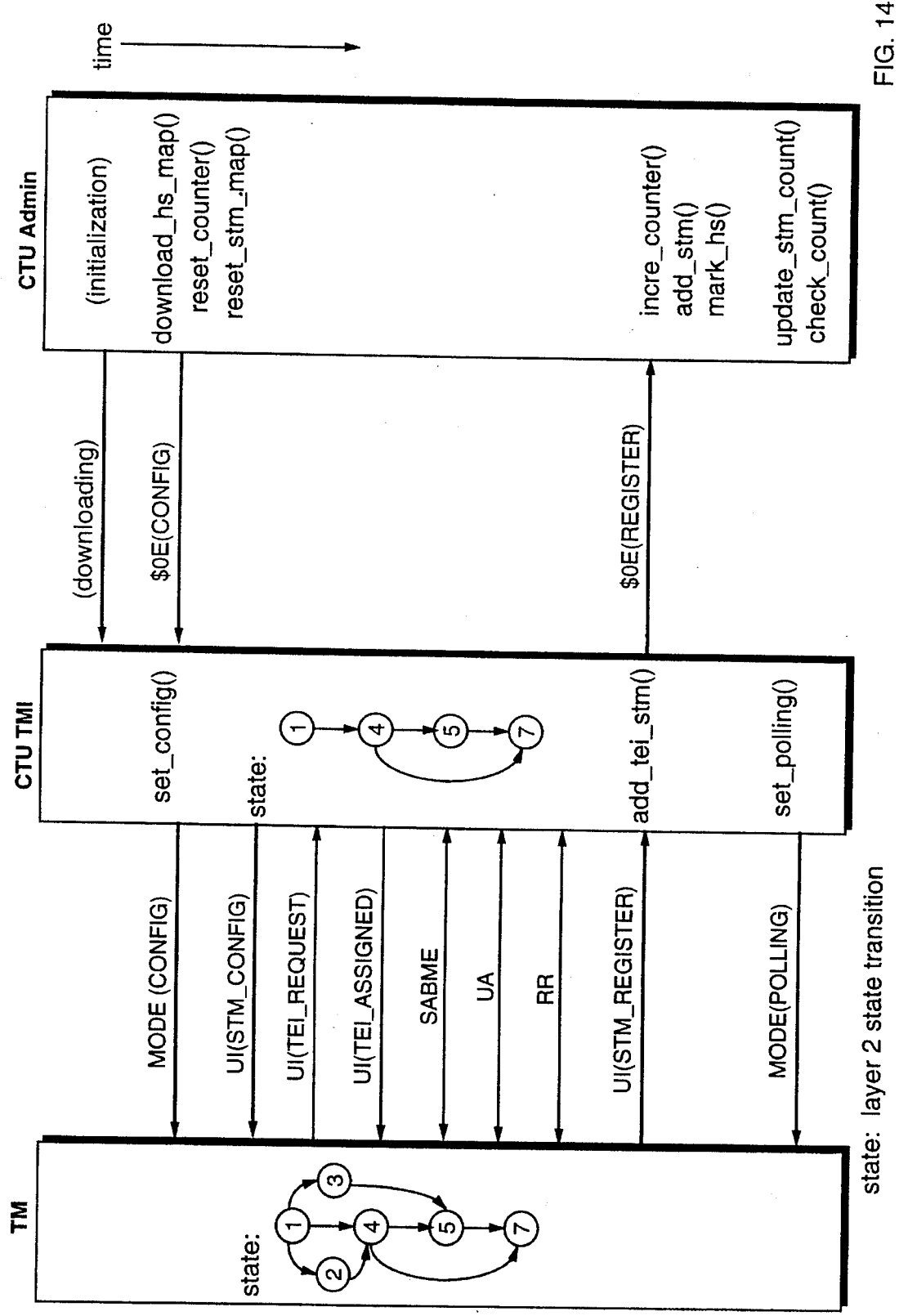
FIG. 14 is a flow chart illustrating the telephony module configuration procedure according to the present invention.

An example of the command structure of a TM_CONFIG command along with layer two state transitions is illustrated in FIG. 14 which illustrates the command flow and responses as the central telephony unit administration or operating system commands the telephony module interface to enter the configuration mode and to configure each telephony module.

During the sequence, the telephony module config command is issued by the telephony unit application during power up or during regular operation when selected via the telephony module maintenance screen. Upon receiving the initialization to commence telephony module configuration, each telephony module interface downloads the two system configuration files 32, 34 discussed in conjunction with FIG. 4 and the central telephony unit establishes a telephony module interface to port address map. Since polling mode is initially entered as the default mode, the central telephony unit resets a counter and issues the configuration command to a first telephony module interface, which transmits the mode_config frame, using the polling mode, to each telephony module in the chain. Subsequently, each telephony module enters the configuration mode and open loop processing begins.

For each telephony module set out in the configuration file, the application sets out a request for configuration ID or assigns an ID to each telephony module, whereby each telephony module returns its telephony module identification, which is entered to the mapping table. The telephony module interface returns a $0E (TM_REGISTER) command to the central telephony unit administration program which increments a counter, adds the telephony module ID to the mapping table and adds the terminal communication equipment to the mapping table, before returning to the polling mode once each and every telephony module in the chain has been configured.

Figure 15:
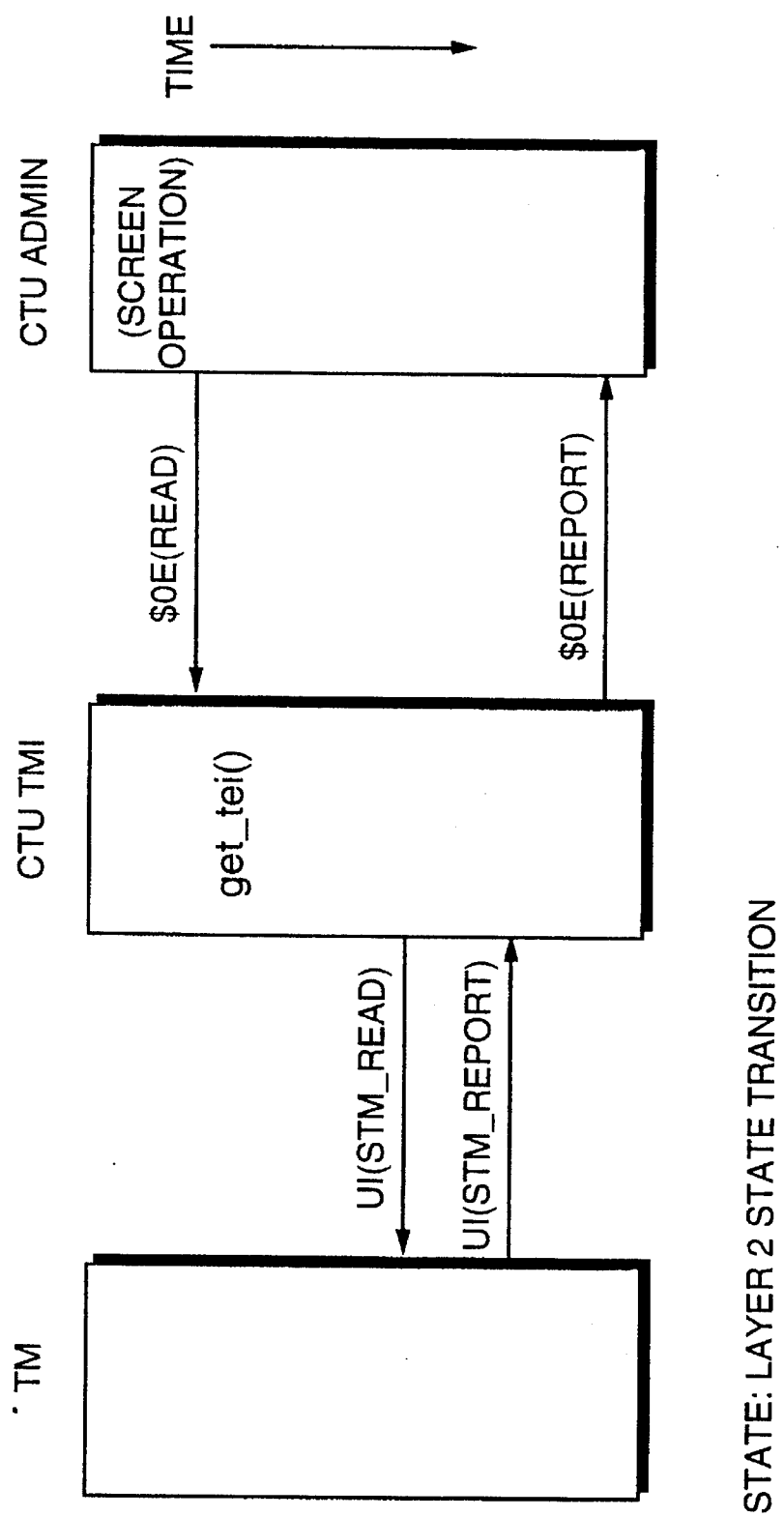
FIG. 15 is a flow chart illustrating the telephony module read operation according to the present invention.

A telephony module read command is illustrated in FIG. 15 wherein the central telephony unit operating system issues the read command with the telephony module number to be read. The central telephony unit telephony module interface obtains the terminal equipment identification code of the telephony module corresponding to the telephony module to be read, whereby the telephony module interface sends the read command to the selected telephony module. The selected telephony module returns a telephony module report to the telephony module interface. The telephony module interface sends back a report to the system controller or administrator in the central telephony unit. If the received telephone module identification differs from the existing telephony module identification, the system can display an error message and take necessary corrective action.

Figure 16:
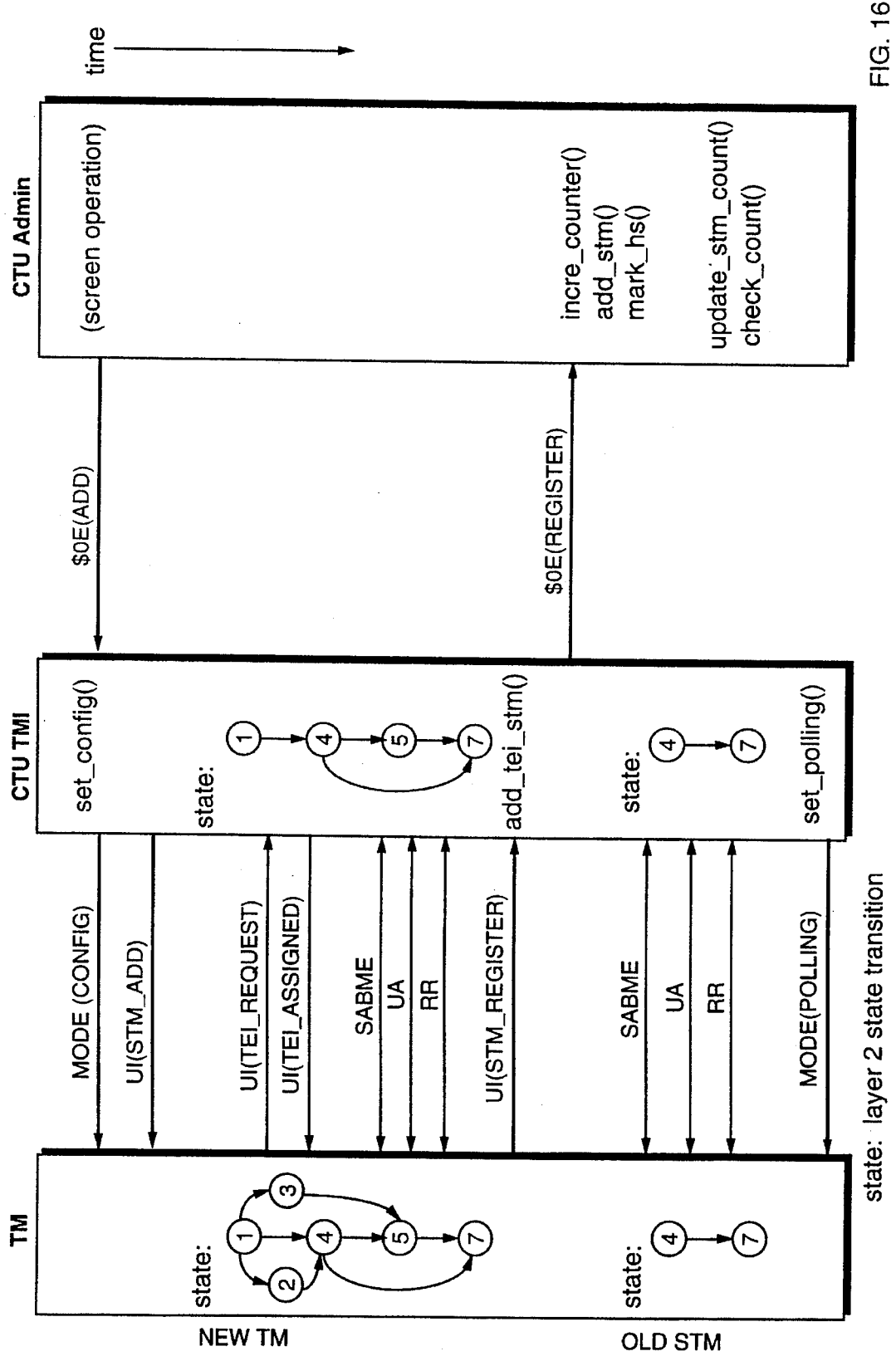
FIG. 16 is a flow chart of the telephony module add operation according to one aspect of the present invention.

A telephony module add command is illustrated in FIG. 16, although this command is not unconditionally supported. For example, if adding a telephony module exceeds the maximum number determined in the configuration file, then adding is not allowed until the system is repowered or a telephony module configuration command is issued under a new configuration file. If a telephony module is returned back to where there was a telephony module previously, for example, the position was previously registered and later removed, then the telephony module add is permitted.

Under this command, the central telephony unit administrator issues an add command to a telephony module interface with the telephony module to be added, in which case the telephony module interface enters the configuration mode by sending out a mode config command to each telephony module while still in the polling mode. After the telephony module has received an identification and this identification is added to the mapping table, the telephony module interface returns a register command to the central telephony unit administrator and the appropriate telephony module transitions its layer 2 state as indicated, prior to the system returning to polling mode. Detailed description of the 7 presently defined states are shown in Table 2 below.

TABLE 2

State Description:

1. CONFIGURATION state:

Initial state of the whole chain. Entered after the system power up. This state indicates the starting point of the system configuration.

2. TEI ASSIGNMENT state:

The state when STMs start requesting EI and CTU assigning TEI to all STMs on after another. Entered right after STM_CONFIG message is sent to the chain, or any new STMs are to be added into the chain (STM_ADD and ID_REQUEST received).

3. STM REGISTRATION state:

The state when STMs start registering to the CTU after their TEIs are assigned. Entered upon receiving the STM_REGISTER message.

4. CTU TRANSMITTING state:

CTUs turn to transmit its packets, if any. Entered after STMs complete registration, or after a LOOPBACK is done which interrupted a previous CTU_TRANSMITTING.

5. STM POLLING state:

STMs turn to transmit their packets, if any. STMs are polled and then transmit in a round robin order. Entered after CTU finishes its transmission, or a LOOPBACK is done which interrupted a previous STM_POLLING.

6. STM LOOPBACK state:

To loopback (short-circuit) a STM and disable it without stopping the whole chain. Entered upon receiving a loopback command.

7. CHAIN-OUTSERVICE state:

The whole chain stop functioning. Entered when system errors or failures occur.

Figure 17:
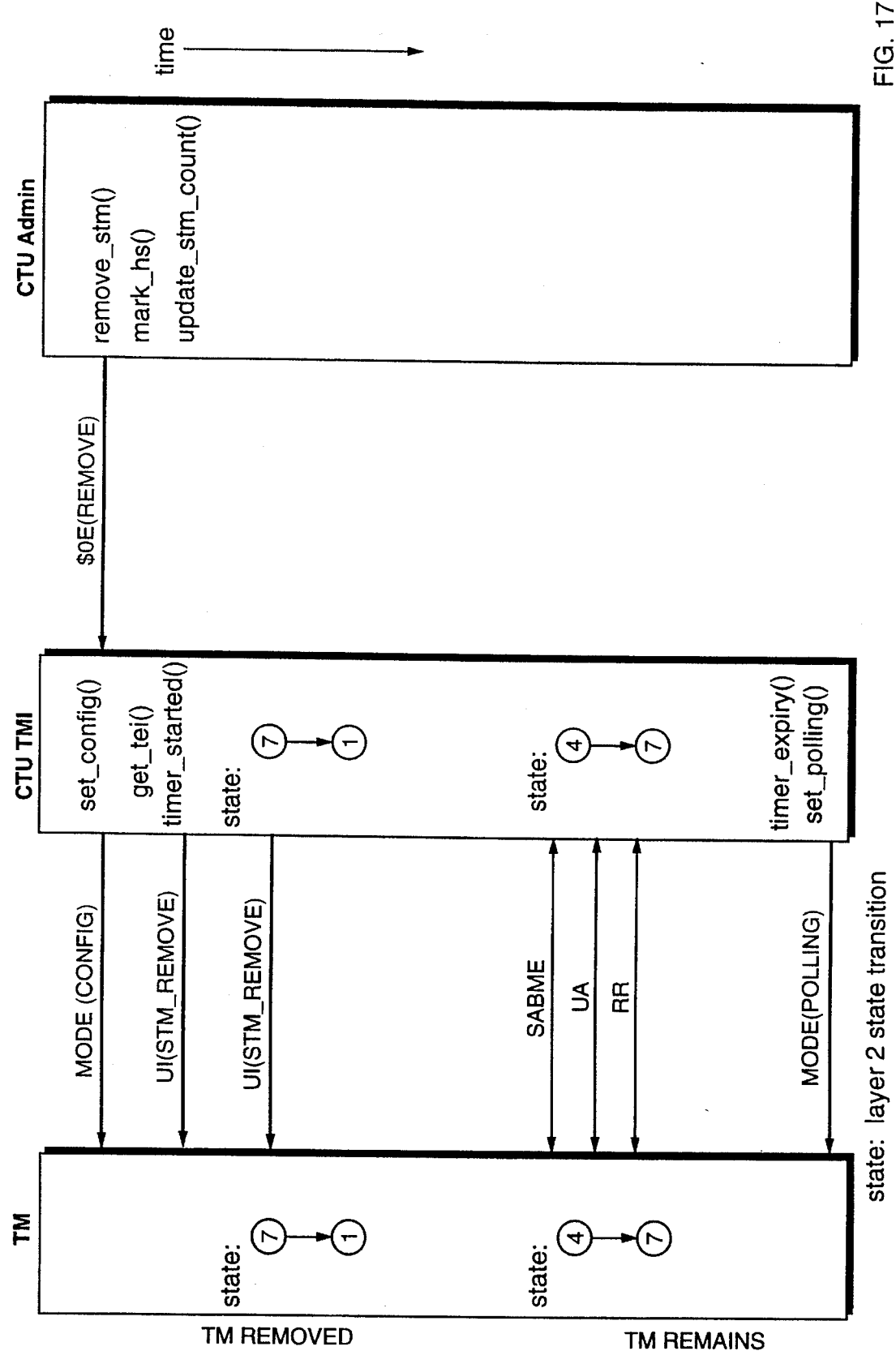
FIG. 17 is a flow chart illustrating the telephony module remove operation according to the present invention.
Figure 18:
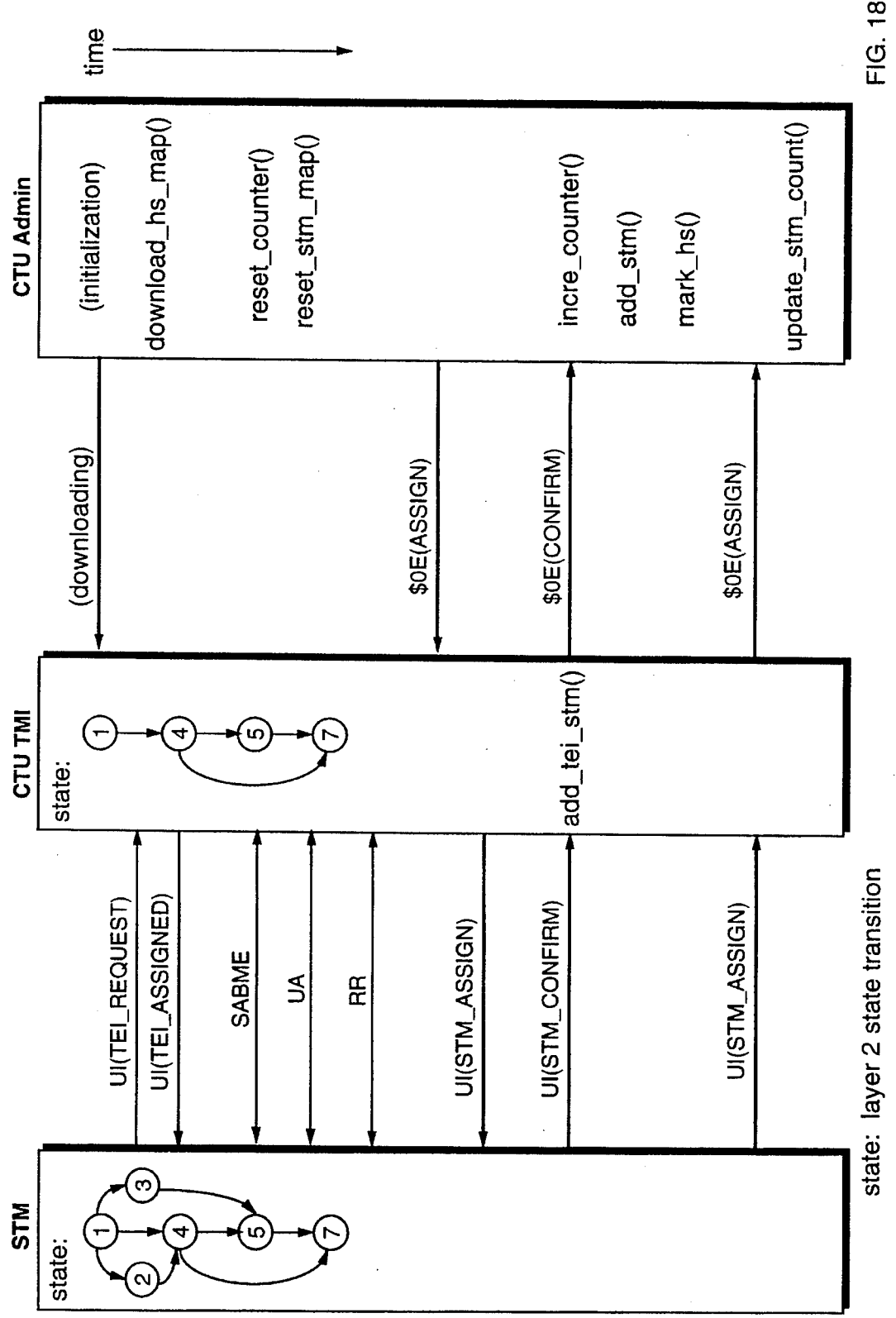
FIG. 18 is a flow chart illustrating the telephony module assign operation according to one aspect of the present invention.
Figure 19:
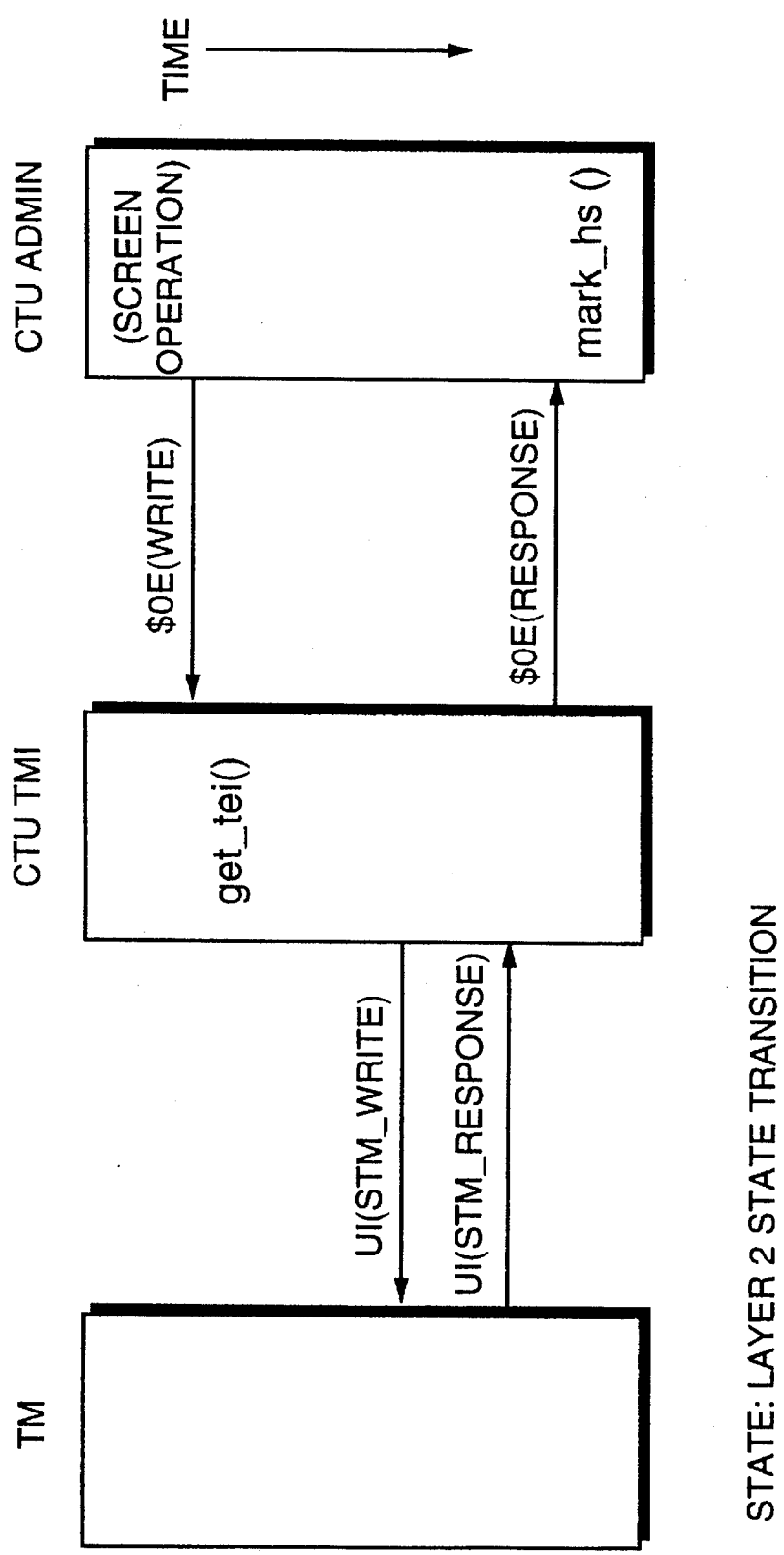
FIG. 19 is a flow chart illustrating the telephony module write operation according to the present invention.

Similarly, telephony module remove, assign and write commands are illustrated in FIGS. 17–19 respectively.

Figure 20:
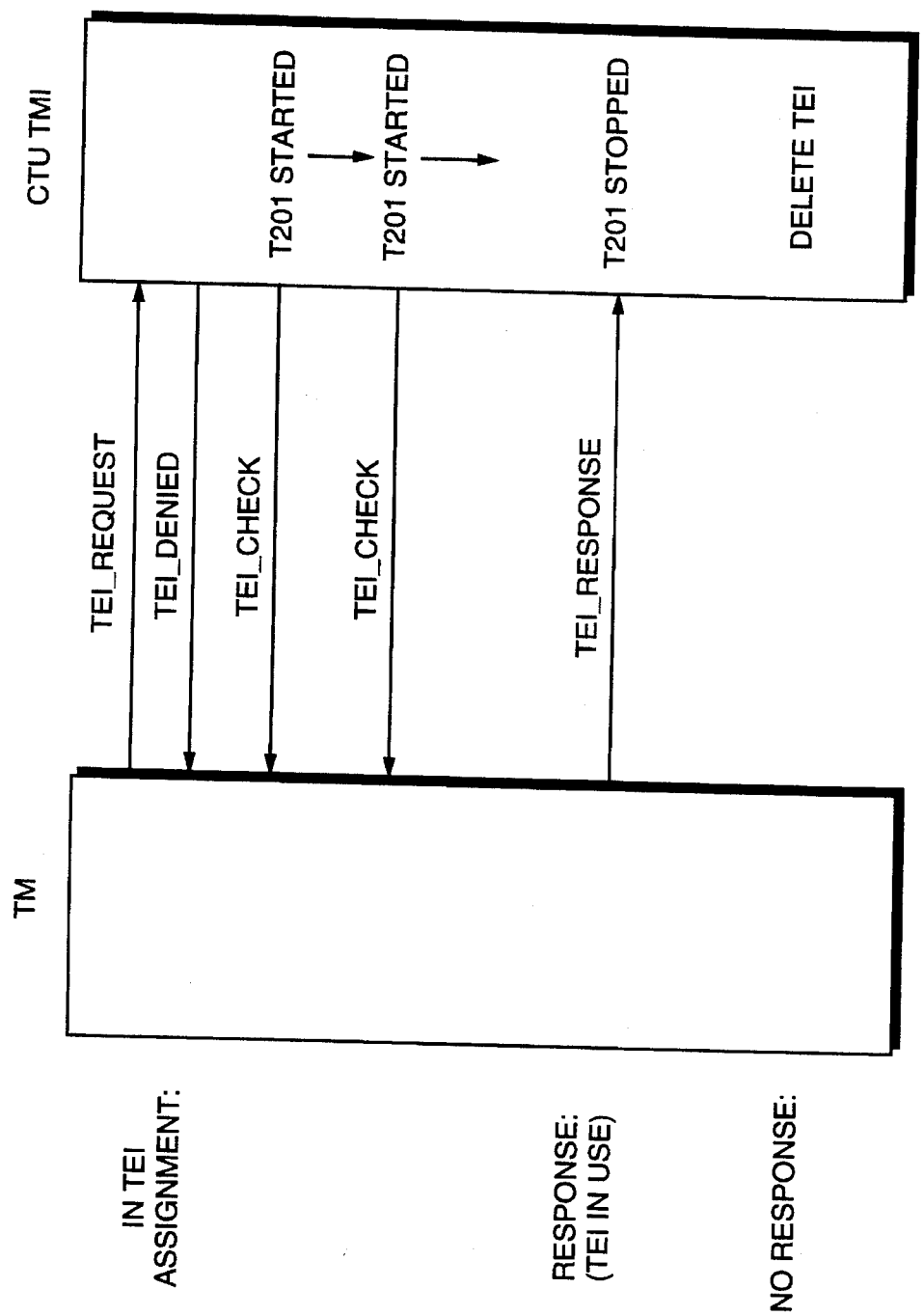
FIG. 20 is a flow chart illustrating the terminal equipment identification check processing procedure according to the present invention.

FIG. 20 illustrates the process of TEI (Terminal Equipment Identifier) check which is associated with telephony module address resolution. The purpose of a TEI check is to determine if a TEI value is in use and is a response to a TEI verify request implemented during a telephony module reconfiguration. This step may be implemented for each telephony module.

Figure 21:
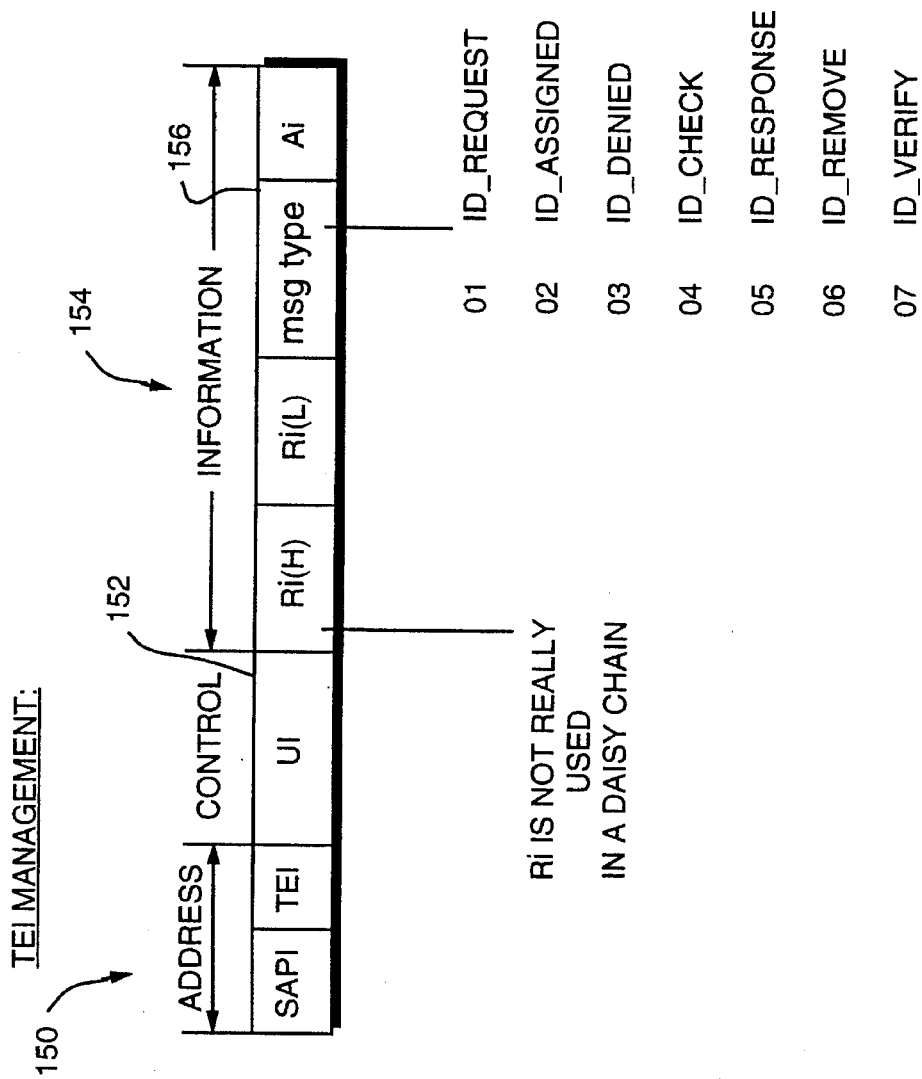
FIG. 21 is a representation of the terminal equipment identification management layer two frame according to the present invention.

Layer two (2) frames are used to support both terminal equipment identification management and telephony module management. As illustrated in FIG. 21, the terminal equipment identification management frame is comprised of multiple bytes including address bytes 150, control byte 152, and information bytes 154, including a message type byte 156 which identifies the type of request being undertaken.

Figure 22:
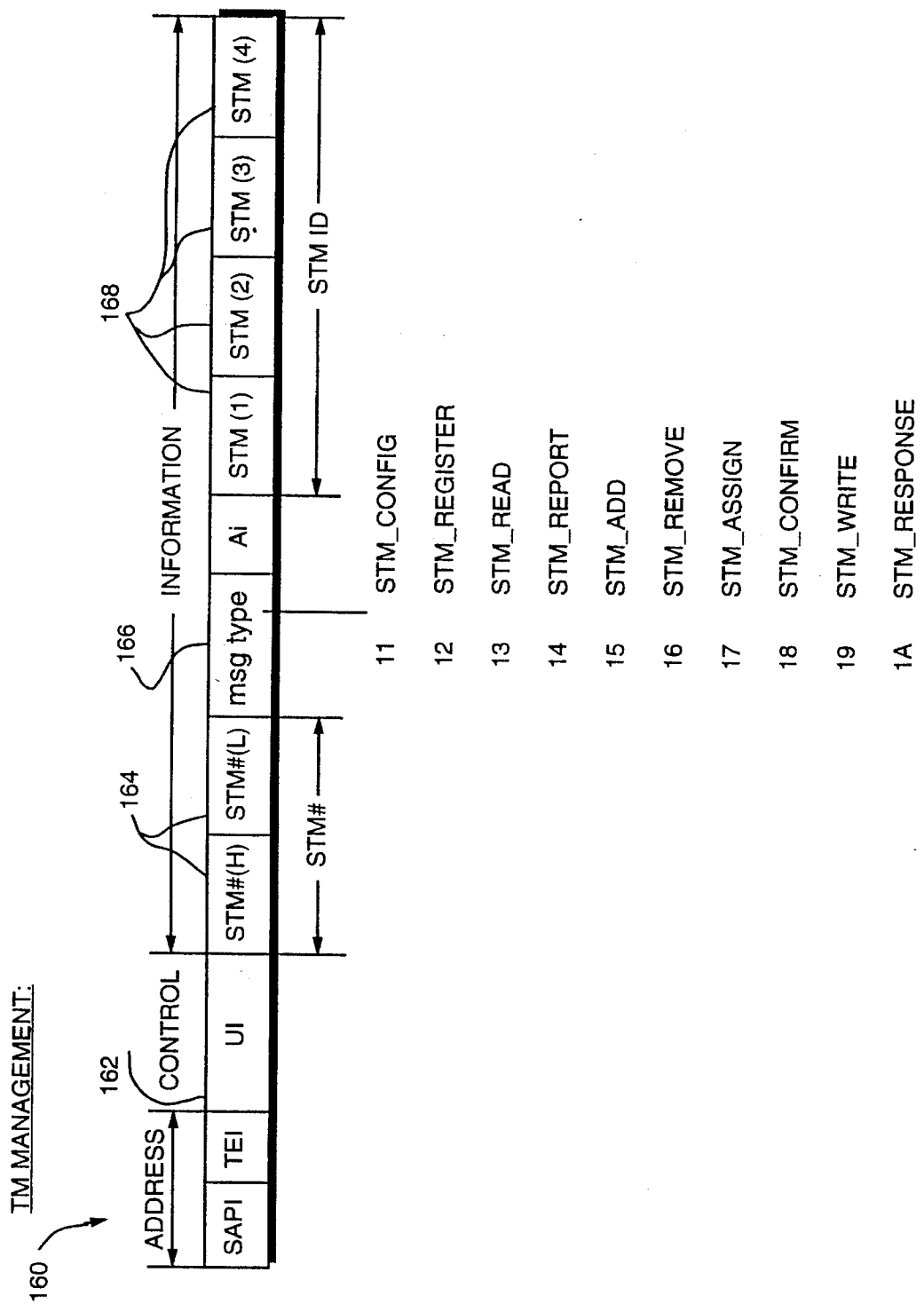
FIG. 22 is an illustration of the telephony module management layer two frame according to the present invention.

Telephony module management framing according to standard ISDN format is illustrated in FIG. 22 which includes a number of address bytes 160, as well as control byte 162. Control byte 162 is followed by telephony module identification bytes 164 followed by message type byte 166. The frame concludes with four telephony module identification number bytes 168. The two new additional mode control frames are illustrated in FIG. 22 wherein frame 170 illustrates a configuration mode control frame while frame 172 illustrates a polling mode control frame.

FIG. 24 illustrates the frames used during the polling mode and include frame 174 which illustrates a polling frame while frame 176 illustrates the acknowledge frame, both frames being identical, but merely reversed in direction.

Although this invention has been described in detail with regard to a specific and preferred implementation, one of ordinary skill in the art will recognize that this invention may be practiced and implemented in many configurations and utilizing one or more methodologies or protocols without departing from the scope of the present invention. Although the present invention has been explained in connection with an ISDN based communication system with a preferred configuration within an aircraft cabin, this is not to be considered a limitation of the present invention, but merely used for exemplary purposes.

Modifications and substitutions by one of ordinary skill in the art are considered to be within the scope of the present invention which is not to be limited except by the claims which follow.

What is claimed is:

1. A point-to-multipoint communication system, comprising:

a central data terminal equipment unit, operative for sending and receiving at least voice communication signals, said central unit including at least one communication equipment module interface;

at least one set of communication equipment modules, each set including at least first and second communication equipment modules, said first communication equipment module coupled to said at least one communication equipment module interface by means of a first communication circuit wire segment, said second communication equipment module coupled to said first communication equipment module by means of a second communication circuit segment, and coupled to said communication equipment module interface by means of a third communication circuit segment; and each of said at least first and second communication equipment modules including a plurality of terminal equipment interfaces, each of said plurality of terminal equipment interfaces adapted for transmitting and receiving said at least voice communication signals to and from at least one coupled terminal communication equipment.

2. The system of claim 1 wherein said at least voice communication signals include voice and data communication signals.

3. The system of claim 2 wherein said voice and data communication signals include voice, data, video and fax signals.

4. A point-to-multipoint ISDN based communication system, comprising:

a central telephony unit, operative for sending, receiving and processing ISDN based communication signals, said central telephony unit including at least one telephony module interface;

at least one set of telephony modules, each set including at least first and second telephony modules, said first telephony module coupled to said at least one telephony module interface by means of a first communication circuit wire segment, said second telephony module coupled to said first telephony module by means of a second communication circuit segment, and coupled to said telephony module interface by means of a third communication circuit segment; and each of said at least first and second telephony modules including a plurality of terminal equipment interfaces, each of said plurality of terminal equipment interfaces adapted for transmitting and receiving communication signals to and from a coupled terminal communication equipment.

5. The communication system of claim 4, further including a plurality of telephony module interfaces, each of said plurality of telephony module interfaces coupled to a respective set of telephony modules, each of said respective sets of telephony modules having a predetermined number of telephony modules.

6. The communication system of claim 5, wherein each of said predetermined number of telephony modules comprising each of said respective sets of telephony modules are coupled in succession forming a series of serially and successively coupled telephony modules, said series of serially and successively coupled telephony modules including a first telephony module in said series, a last telephony module in said series, and a plurality of said telephony modules intermediate said first and last telephony modules;

said first telephony module in said series of telephony modules coupled to a respective telephony module interface by said first communication circuit segment, said plurality of telephony modules intermediate said first and last telephony module and said last telephony module serially and successively coupled to said first telephony module by means of a plurality of second communication circuit segments; and said last telephony module coupled to said telephony module interface by means of said third communication circuit segment.

7. The communication system of claim 4, wherein each of said first, second and third communication circuit segments include a two wire electrical circuit.

8. The communication system of claim 4, wherein said point-to-multipoint ISDN based communication system is disposed in an airplane cabin; and wherein said at least first and second telephony modules include airplane cabin seat telephony modules, each said telephony module adapted for handling communication to at least one segment of one row of airplane cabin seats; and wherein said plurality of terminal communication equipment include a plurality of airplane cabin seat communication terminals, each airplane cabin seat communication terminal disposed at one airplane cabin seat and coupled to a predetermined airplane cabin seat telephony module.

9. The communication system of claim 4, wherein said communication system is selectably operative in one of a configuration mode and an operational mode;

wherein in said configuration mode, said central telephony unit identifies each set of telephony modules coupled to a corresponding telephony module interface, identifies each coupled telephony module which forms each telephony module set, and identifies each terminal communication equipment coupled to each telephony module, and wherein said configuration mode determines one unique terminal communication equipment identifier for each coupled terminal communication equipment; and wherein in said operational mode, each terminal communication equipment in a respective set of telephony modules examines each and every message directed to at least said respective set of telephony modules while generally simultaneously passing said each and every message to each other terminal communication equipment in said respective set of telephony modules, said each and every message including a unique terminal communication identifier which identifies one terminal communication equipment coupled to one telephony module to which a respective message is directed, and whereby each terminal communication equipment coupled to each telephony module responds only to a message which includes a unique terminal communication equipment identifier which corresponds to its unique terminal communication equipment identifier.

10. The communication system of claim 4, wherein said at least one telephony module interface includes an interface generally conforming to an ISDN primary rate interface (PRI) specification.

11. The communication system of claim 4, wherein each of said at least first and second telephony modules includes an internal communication link to couple said first communication circuit wire segment to said second communication wire segment, and said second communication wire segment to said third communication circuit wire segment.

12. A method of providing point-to-multipoint communication over a single data link, comprising the steps of:

providing a central data terminal equipment unit, operative for sending, receiving and processing communication signals, said central data terminal equipment unit including at least one communication equipment module interface; and providing at least one set of communication equipment modules coupled to said at least one communication equipment module interface of said central data terminal equipment unit, each of said at least one set of communication equipment modules including the first and second communication equipment modules, said first communication equipment module coupled to said at least one communication equipment module interface by means of a first communication circuit, second communication equipment module coupled to said first communication equipment module by means of a second communication circuit segment, and coupled to said communication equipment module interface by means of a third communication circuit segment, each of said at least first and second communication equipment modules including a plurality of terminal equipment interfaces adapted for transmitting and receiving communication signals to and from a coupled terminal communication equipment.

13. The method of claim 12, wherein the method of providing point-to-multipoint communication includes providing communication in one of a configuration mode and an operational mode, wherein in said configuration mode, said central data terminal equipment unit identifies each set of communication equipment module coupled to a corresponding communication equipment module interface, identifies each coupled communication equipment module which forms each communication equipment module set, and identifies each terminal communication equipment coupled to each communication equipment module, and wherein said configuration mode determines one unique terminal communication equipment identifier for each coupled terminal communication equipment; and wherein in said operational mode, each terminal communication equipment in a respective set of communication equipment modules examines each and every message directed to at least said respective set of communication equipment modules by said central data terminal equipment unit, while generally simultaneously passing said each and every message to each other terminal communication equipment in said respective set of communication equipment modules, said each and every message including a unique terminal communication identifier which identifies one terminal communication equipment coupled to one communication equipment module to which a respective message is directed, and whereby each terminal communication equipment coupled to each communication equipment module responds only to a message which includes a unique terminal communication equipment identifier which corresponds to its unique terminal communication equipment identifier.

14. The method of claim 12, wherein said central data terminal equipment unit includes a central telephony unit, operative for sending, receiving and processing ISDN based communication signals; and wherein said at least first and second communication equipment module include at least first and second telephony modules.

15. A point-to-multipoint ISDN based communication system for an airplane cabin, comprising:

a central telephony unit, operative for sending, receiving and processing ISDN based at least voice communication signals, said central telephony unit including at least one telephony module interface;

at least one set of telephony modules, each set including at least first and second airplane cabin seat telephony modules, each of said at least first and second airplane cabin seat telephony module adapted for handling communication to at least one segment of at least one row of airplane cabin seats, said first airplane cabin seat telephony module coupled to said at least one telephony module interface by means of a first communication circuit wire segment, said second airplane cabin seat telephony module coupled to said first airplane cabin seat telephony module by means of a second communication circuit segment, and coupled to said telephony module interface by means of a third communication circuit segment; and each of said at least first and second airplane cabin seat telephony modules including a plurality of terminal equipment interfaces, each of said plurality of terminal equipment interfaces adapted for transmitting and receiving communication signals to and from at least one coupled terminal communication equipment, each terminal communication equipment including an airplane cabin seat communication terminal, each cabin seat communication terminal disposed at one airplane cabin seat and coupled to a predetermined airplane cabin seat telephony module.

16. The system of claim 15 wherein said ISDN based at least voice communication signals include ISDN based voice, data, video and fax communication signals.

17. A point-to-multipoint ISDN based communication system for a mass transport vehicle, comprising:

a central telephony unit, operative for sending and receiving ISDN based at least voice communication signals, said central telephony unit including at least one telephony module interface;

at least one set of telephony modules, each set including at least first and second mass transport vehicle seat telephony modules, each of said at least first and second mass transport vehicle telephony modules adapted for handling communication to at least one segment of at least one row of a mass transport vehicle, said first mass transport vehicle telephony module coupled to said at least one telephony module interface by means of a first communication circuit wire segment, said second mass transport vehicle telephony module coupled to said first mass transport vehicle telephony module by means of a second communication circuit segment, and coupled to said telephony module interface by means of a third communication circuit segment; and each of said at least first and second mass transport vehicle telephony modules including a plurality of terminal equipment interfaces, each of said plurality of terminal equipment interfaces adapted for transmitting and receiving communication signals to and from at least one coupled terminal communication equipment, each of said coupled terminal communication equipment including an mass transport vehicle communication terminal, each mass transport vehicle cabin seat communication terminal disposed at one mass transport vehicle seat and coupled to a predetermined mass transport vehicle telephony module.

* * * * *